United States Patent
Kama et al.

(10) Patent No.: US 10,640,166 B2
(45) Date of Patent: May 5, 2020

(54) TRAVELING APPARATUS

(71) Applicant: TOYOTA JIDOSHA KABUSHIKI KAISHA, Toyota-shi, Aichi-ken (JP)

(72) Inventors: Takeshi Kama, Nagakute (JP); Makoto Kakuchi, Toyota (JP); Makoto Mori, Nagakute (JP); Eisuke Aoki, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 246 days.

(21) Appl. No.: 15/632,489

(22) Filed: Jun. 26, 2017

(65) Prior Publication Data

US 2018/0043958 A1 Feb. 15, 2018

(30) Foreign Application Priority Data

Aug. 12, 2016 (JP) .................. 2016-158717

(51) Int. Cl.
  *B62K 5/025* (2013.01)
  *B62K 15/00* (2006.01)
  (Continued)

(52) U.S. Cl.
  CPC .............. *B62K 5/025* (2013.01); *B62K 3/002* (2013.01); *B62K 5/06* (2013.01); *B62K 15/006* (2013.01);
  (Continued)

(58) Field of Classification Search
  CPC ............ B60G 2300/40; B60G 2300/37; B60G 2300/12; B60W 2300/46; B60Y 2200/43;
  (Continued)

(56) References Cited

U.S. PATENT DOCUMENTS

| 4,613,151 A * | 9/1986 | Kielczewski | A61G 5/042 180/216 |
| 4,794,999 A * | 1/1989 | Hester | A61G 5/061 180/8.2 |

(Continued)

FOREIGN PATENT DOCUMENTS

| CN | 107585243 A | 1/2018 |
| JP | 54-105195 U | 7/1979 |

(Continued)

*Primary Examiner* — James A Shriver, II
*Assistant Examiner* — Vaughn Coolman
(74) *Attorney, Agent, or Firm* — Sughrue Mion, PLLC

(57) ABSTRACT

Provided is a traveling apparatus including at least, with respect to a traveling direction, a front wheel and a rear wheel and on which a user rides when traveling. The traveling apparatus includes a driving unit configured to drive at least one of the front wheel and the rear wheel, an adjusting mechanism including a rotation part configured to rotate a front wheel supporting member and a rear wheel supporting member in relation to each other, the adjusting mechanism being configured to adjust a wheel base length between the front wheel and the rear wheel by an action of the user being transmitted, thereby changing an angle formed by the front wheel supporting member and the rear wheel supporting member, and a control unit configured to control the driving unit based on a parameter, the parameter changing in conjunction with the wheel base length.

11 Claims, 18 Drawing Sheets

(51) Int. Cl.
   *B62K 5/06* (2006.01)
   *B62K 21/16* (2006.01)
   *B62K 25/02* (2006.01)
   *B62K 3/00* (2006.01)
   *B62K 7/00* (2006.01)
   *B60K 7/00* (2006.01)

(52) U.S. Cl.
   CPC .............. *B62K 21/16* (2013.01); *B62K 25/02* (2013.01); *B60K 7/0007* (2013.01); *B60K 2007/0038* (2013.01); *B60Y 2200/126* (2013.01); *B60Y 2200/43* (2013.01); *B62K 2204/00* (2013.01)

(58) Field of Classification Search
   CPC ................... B60K 7/00; B60K 7/0007; B60K 2007/0038; B60K 2007/0092
   See application file for complete search history.

(56) References Cited

U.S. PATENT DOCUMENTS

| | | | | |
|---|---|---|---|---|
| 6,374,934 | B1* | 4/2002 | Beck | B62D 63/02 180/65.51 |
| D483,821 | S* | 12/2003 | Yang | D12/112 |
| 7,182,166 | B2* | 2/2007 | Gray | A61G 5/045 180/209 |
| D586,265 | S* | 2/2009 | Lin | D12/111 |
| 7,717,200 | B2* | 5/2010 | Kakinuma | A63C 17/08 180/218 |
| 7,717,210 | B2* | 5/2010 | Mahy | A61G 5/046 180/209 |
| 8,050,820 | B2* | 11/2011 | Yanaka | B60G 3/01 180/41 |
| D650,724 | S* | 12/2011 | Chiang | D12/111 |
| 8,894,088 | B2* | 11/2014 | Lark, Jr. | B62D 21/14 280/639 |
| 9,205,889 | B2* | 12/2015 | Paick | B62M 6/60 |
| 9,873,476 | B2* | 1/2018 | Etzelsberger | B62K 15/006 |
| 9,889,872 | B2* | 2/2018 | Somerset | B62B 7/008 |
| D827,035 | S* | 8/2018 | Delgatty | D21/423 |
| 10,150,528 | B2* | 12/2018 | Kano | B62K 5/06 |
| 2006/0108156 | A1* | 5/2006 | Heinzmann | B60L 15/2036 180/8.2 |
| 2008/0116665 | A1* | 5/2008 | Nakaizumi | B62D 21/14 280/638 |
| 2008/0295595 | A1* | 12/2008 | Tacklind | A61G 5/14 73/462 |
| 2012/0012413 | A1* | 1/2012 | Tsai | B62K 3/005 180/209 |
| 2012/0101703 | A1* | 4/2012 | Morita | A61G 5/041 701/70 |
| 2013/0015633 | A1* | 1/2013 | Nakabayashi | B62K 25/283 280/281.1 |
| 2015/0042053 | A1* | 2/2015 | Berndorfer | B62K 3/002 280/7.1 |
| 2015/0068828 | A1* | 3/2015 | Delgatty | B62K 5/06 180/210 |
| 2016/0083039 | A1* | 3/2016 | Delgatty | B62K 5/06 180/65.51 |
| 2017/0259871 | A1* | 9/2017 | Delgatty | B62K 5/06 |
| 2018/0009489 | A1 | 1/2018 | Kama et al. | |
| 2018/0022412 | A1* | 1/2018 | Etzelsberger | B62J 1/02 180/208 |
| 2018/0338877 | A1* | 11/2018 | Kano | A61G 5/047 |

FOREIGN PATENT DOCUMENTS

| | | |
|---|---|---|
| JP | 01-106717 A | 4/1989 |
| JP | 2005-231415 A | 9/2005 |
| JP | 2008-517569 A | 5/2008 |
| JP | 2010-167809 A | 8/2010 |
| JP | 2012-76671 A | 4/2012 |
| JP | 5316640 B2 | 10/2013 |
| JP | 2014-159211 A | 9/2014 |

* cited by examiner

| ROTATION ANGLE $\theta$ (DEGREE) | $\theta_{MIN}-\theta_1$ | $\theta_1-\theta_2$ | $\theta_2-\theta_3$ | $\theta_3-\theta_{MAX}$ |
|---|---|---|---|---|
| TARGET SPEED (km/h) | 0 | 5.0 | 10.0 | 15.0 |

TRAVELING APPARATUS

CROSS REFERENCE TO RELATED APPLICATIONS

This application is based upon and claims the benefit of priority from Japanese patent application No. 2016-158717, filed on Aug. 12, 2016, the disclosure of which is incorporated herein in its entirety by reference.

BACKGROUND

Nowadays, personal mobility vehicles have been attracting attention. A personal mobility vehicle is often manufactured in a small size in view of maneuverability, which raises a problem that it lacks stability when traveling at a high speed. In order to improve stability of vehicles, including personal mobility vehicles but not limited thereto, vehicles having adjustable wheel base lengths have been suggested (e.g., Japanese Unexamined Patent Application Publication Nos. H1-106717 and 2005-231415).

SUMMARY

Many of the vehicles with adjustable wheel base lengths, which have heretofore been suggested, are produced based on passenger vehicles. Thus, despite of what their names suggests, personal mobility vehicles have been too large and heavy for individuals to use casually in a small space.

The present invention has been made to solve such a problem and provides a compact and lightweight traveling apparatus that achieves good maneuverability when traveling at a low speed and stability when traveling at a high speed.

An example aspect of the present invention is a traveling apparatus including at least, with respect to a traveling direction, a front wheel and a rear wheel and on which a user rides when traveling. The traveling apparatus includes: a front wheel supporting member configured to rotatably support the front wheel; a rear wheel supporting member configured to rotatably support the rear wheel; driving unit configured to drive at least one of the front wheel and the rear wheel; an adjusting mechanism including a rotation part configured to rotate the front wheel supporting member and the rear wheel supporting member in relation to each other, the adjusting mechanism being configured to adjust a wheel base length between the front wheel and the rear wheel by an action of the user being transmitted, thereby changing an angle formed by the front wheel supporting member and the rear wheel supporting member; and a control unit configured to control the driving unit based on a parameter, the parameter changing in conjunction with the wheel base length.

By employing a simple mechanism of rotating the front wheel supporting member and the rear wheel supporting member in relation to each other, the wheel base length is adjusted by utilizing a force of the action of the user. Accordingly, a compact and lightweight personal mobility vehicle is achieved.

According to the present invention, it is possible to provide a compact and lightweight traveling apparatus that can achieve good maneuverability when traveling at a low speed and stability when traveling at a high speed.

The above and other objects, features and advantages of the present invention will become more fully understood from the detailed description given hereinbelow and the accompanying drawings which are given by way of illustration only, and thus are not to be considered as limiting the present invention.

DESCRIPTION OF EMBODIMENTS

Hereinafter, although the present invention will be described with reference to embodiments of the invention, the invention according to claims is not limited to the following embodiments. Moreover, all the components described in the following embodiments are not necessarily indispensable for means to solve problems.

Figure 1:
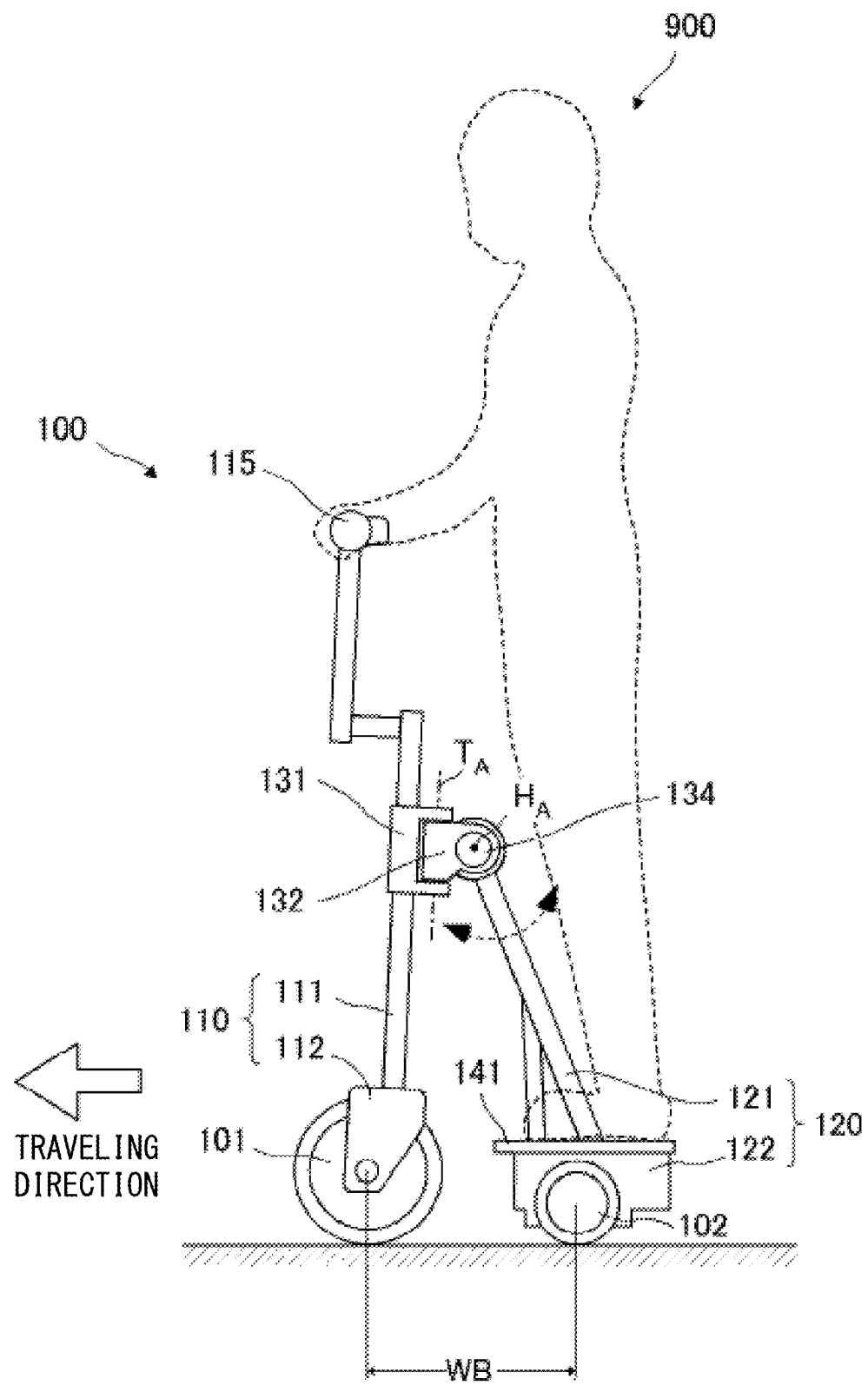
FIG. 1 is a lateral overview diagram of a traveling apparatus according to a first embodiment when it travels at a low speed.
Figure 2:
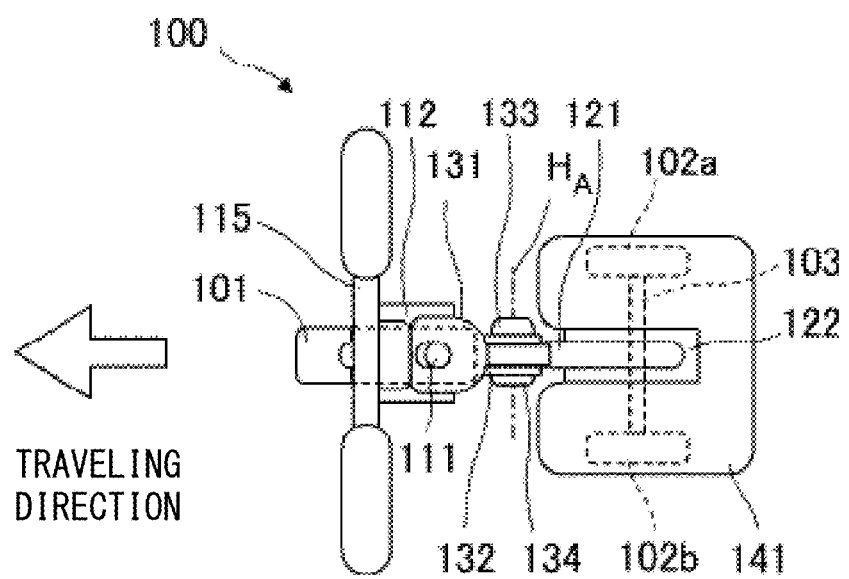
FIG. 2 is a top overview diagram of the traveling apparatus of FIG. 1.

A first embodiment will be described below. FIG. 1 is a lateral overview diagram of a traveling apparatus 100 according to the first embodiment when it travels at a low speed. FIG. 2 is a top lateral diagram as viewed from above the traveling apparatus 100 that is in the state shown in FIG. 1. In FIG. 2, a user 900, who is illustrated by the dotted line in FIG. 1, is not shown.

The traveling apparatus 100 is one kind of personal mobility vehicle and is an electrically operated mobile vehicle in which a user stands when he/she rides on the traveling apparatus 100. The traveling apparatus 100 includes, with respect to the traveling direction, one front wheel 101 and two rear wheels 102 (right rear wheel 102a and left rear wheel 102b). An orientation of the front wheel 101 is changed when the user 900 operates a handlebar 115. The front wheel 101 functions as a steering wheel. The right rear wheel 102a and left rear wheel 102b are coupled by a wheel axis 103 and driven by a motor and a deceleration mechanism (not shown). The right rear wheel 102a and the left rear wheel 102b function as driving wheels. The traveling apparatus 100 is grounded at three points by the three wheels and is a statically stable vehicle that is self-supported even when the traveling apparatus 100 is parked without the user 900 riding thereon.

The front wheel 101 is rotatably supported by a front wheel supporting member 110. The front wheel supporting member 110 includes a front pole 111 and a fork 112. The fork 112 is fixed to one end of the front pole 111 and sandwiches the front wheel 101 to rotatably support the front wheel 101 on both of its sides. The handlebar 115 is extended in the rotation axis direction of the front wheel 101 and fixed to the other end of the front pole 111. When the user 900 turns the handlebar 115, the front pole 111 transmits a force of the operation to the front wheel 101 to change its orientation.

The rear wheels 102 are rotatably supported by a rear wheel supporting member 120. The rear wheel supporting member 120 includes a rear pole 121 and a body part 122. The body part 122 fixes and supports one end of the rear pole 121 and rotatably supports the right rear wheel 102a and left rear wheel 102b with the wheel axis 103 interposed between the right rear wheel 102a and left rear wheel 102b. The body part 122 also functions as a housing that accommodates the above-mentioned motor and deceleration mechanism, and a battery etc. that supplies power to the motor. A step 141, for the user 900 to place his/her feet on, is provided on the upper surface of the body part 122.

The front wheel supporting member 110 and rear wheel supporting member 120 are coupled to each other with a pivot joint 131 and a hinge joint 132 interposed therebetween. The pivot joint 131 is fixed to the front pole 111 that constitutes the front wheel supporting member 110 at a position near the other end of the front pole 111 to which the handlebar 115 is fixed. Further, the pivot joint 131 is pivotally arranged on the hinge joint 132 and rotates in relation to the hinge joint 132 around a pivot axis $T_A$, which is disposed parallel to the direction in which the front pole 111 is extended. The hinge joint 132 is pivotally arranged on one end of the rear pole 121, which constitutes the rear wheel supporting member 120, that is opposite to an end of the rear pole 121 supported by the body part 122. The hinge joint 132 rotates in relation to the rear pole 121 around a hinge axis $H_A$, which is disposed parallel to the direction in which the wheel axis 103 is extended.

With such a structure, when the user 900 turns the handlebar 115, the front wheel supporting member 110 rotates around the pivot axis $T_A$ with respect to the rear wheel supporting member 120, so that the orientation of the front wheel 101 can be changed. Moreover, when the user 900 tilts the handlebar 115 forward in the traveling direction, the tilting action is transmitted to the front wheel supporting member 110 and rear wheel supporting member 120 to thereby rotate the front wheel supporting member 110 and rear wheel supporting member 120 in relation to each other around the hinge axis $H_A$, so that an angle formed by the front pole 111 and rear pole 121 can be made smaller. When the angle formed by the front pole 111 and rear pole 121 is made small, a WB length, which is a distance of a wheel base (WB) between the front wheel 101 and rear wheels 102 will become shorter. On the contrary, when the user 900 tilts the handlebar 115 backward in the traveling direction, the front wheel supporting member 110 and rear wheel supporting member 120 rotate in relation to each other around the hinge axis $H_A$, so that the angle formed by the front pole 111 and rear pole 121 can be made larger. When the angle formed by the front pole 111 and rear pole 121 increases, the WB length increases. That is, the user 900 can reduce or increase the WB length by performing an action as a rotation force.

A biasing spring 133 is attached to around the hinge joint 132. The biasing spring 133 exerts a biasing force on the hinge axis $H_A$ in the rotation direction that reduces the angle formed by the front pole 111 and rear pole 121. The biasing spring 133 is, for example, a torsion spring. The biasing force of the biasing spring 133 changes the angle formed by the front pole 111 and rear pole 121 to be structurally the smallest angle when the user 900 is not in contact with the handlebar 115. On the other hand, the biasing force of the biasing spring 133 is configured in such a degree as to enable the user 900 to easily tilt the handlebar 115 backward in the traveling direction. Accordingly, the user 900 can adjust the angle formed by the front pole 111 and rear pole 121 and thus the WB length by changing at least one of a weight on the handlebar 115 and a weight on the step 141.

A rotation angle sensor 134 is attached to around the hinge joint 132. The rotation angle sensor 134 outputs the angle formed by the front pole 111 and rear pole 121 around the hinge axis $H_A$. The rotation angle sensor 134 is, for example, a rotary encoder. An output from the rotation angle sensor 134 is sent to a control unit, which will be described later.

Figure 3:
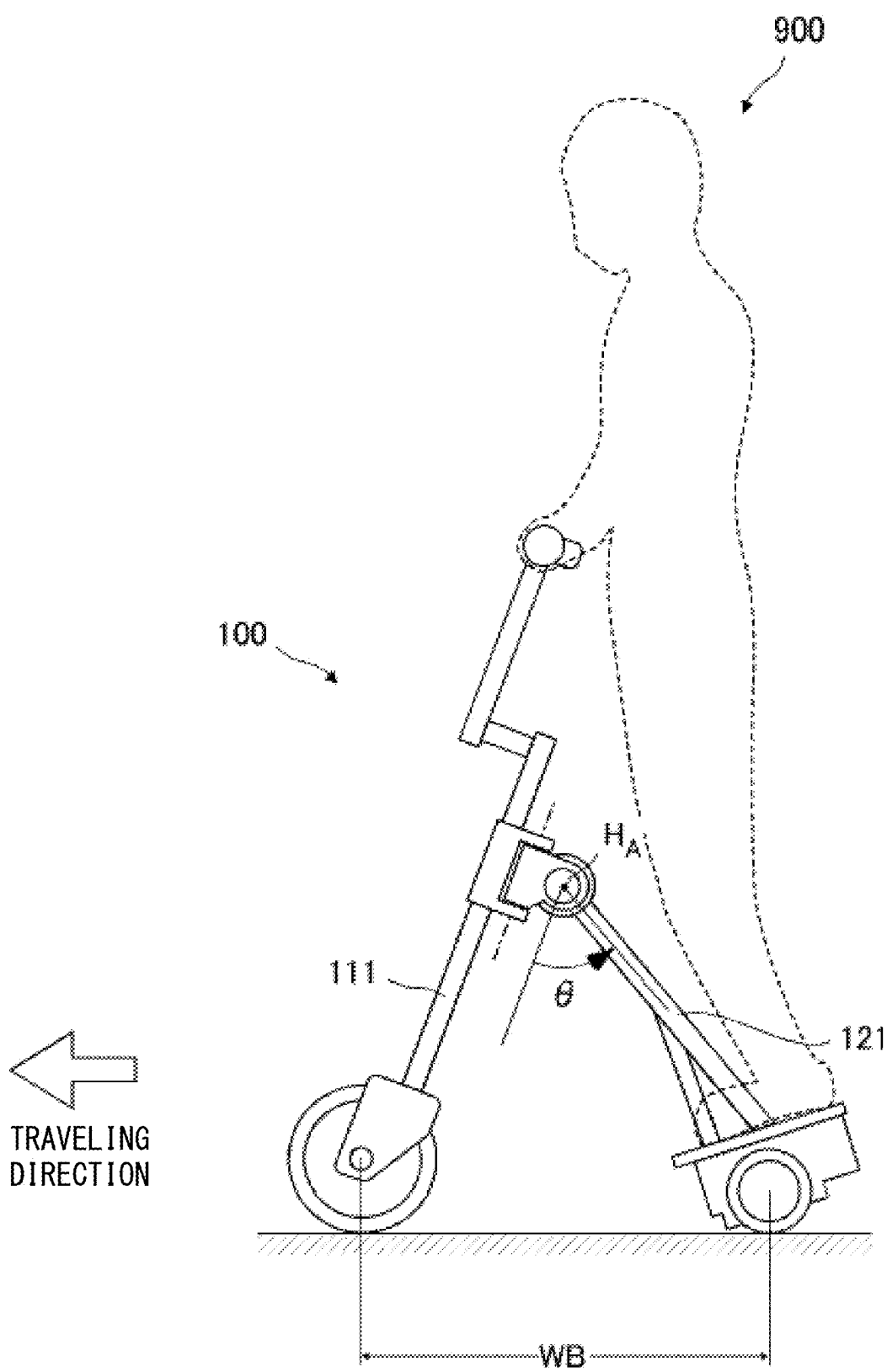
FIG. 3 is a lateral overview diagram of the traveling apparatus of FIG. 1 when it travels at a high speed.

The traveling apparatus 100 travels at a low speed when the WB length is short and travels at a high speed when the WB length is long. FIG. 1 shows a state of the traveling apparatus 100 with a short WB length traveling at a low speed. FIG. 3 is a lateral overview diagram of the traveling apparatus 100 shown in FIG. 1 and shows a state of the traveling apparatus 100 with a long WB length traveling at a high speed.

As shown in the drawings, a direction in which the angle formed by the front pole 111 and rear pole 121 relatively increases shall be positive, and a rotation angle shall be θ. Further, a minimum value the rotation angle θ can take (minimum angle) shall be $θ_{MIN}$, and a maximum value the rotation angle θ can take (maximum angle) shall be $θ_{MAX}$. For example, $θ_{MIN}$ is 10 degrees, and $θ_{MAX}$ is 80 degrees. In other words, a structural control member is provided so that the rotation angle θ falls within a range between $θ_{MIN}$ and $θ_{MAX}$.

The WB length corresponds one-to-one to the rotation angle θ and can be calculated by the function, WB length=f (θ). Therefore, the WB length can be adjusted by changing the rotation angle θ. The traveling apparatus 100 of this embodiment accelerates when the user 900 increases the rotation angle θ and decelerates when the user 900 reduces the rotation angle θ. That is, the target speed is associated with the rotation angle θ, and a change in the rotation angle θ causes the traveling apparatus 100 to accelerate/decelerate in order to reach the target speed associated with the changed rotation angle θ. In other words, the rotation angle θ is used as a parameter to associate the WB length with the target speed, and when the user 900 adjusts the WB length, the target speed is changed according to the adjusted WB length.

When the rotation angle θ is reduced, the WB length becomes shorter, thereby improving maneuverability. That is, the traveling apparatus 100 can move around in a small space. On the contrary, when the rotation angle θ is increased, the WB length becomes longer, thereby improving travel stability, in particular, straight drivability. That is, the traveling apparatus 100 is less susceptible to sway caused by bumps and the like on the road even when traveling at a high speed. As the WB length is changed in conjunction with a change in the speed, the WB length will not be long when the traveling apparatus 100 is traveling at a low speed, and thus the traveling apparatus 100 can move in a projected area minimal at the low speed. That is, an area on the road necessary for the traveling apparatus 100 to travel in is small without requiring an excess area. This effect is especially pronounced when the traveling apparatus 100 is parked. As the user 900 can change both the speed and WB length in conjunction with each other when he/she tilts the handlebar 115 forward and backward, the driving operation is easy and simple.

Since the WB length is adjusted by transmitting an acting force generated by the action of the user 900, an actuator for adjusting the WB length is unnecessary. For this reason, the weight of the traveling apparatus 100 according to this embodiment is reduced as a whole. Accordingly, unlike the personal mobility vehicles of related art, the traveling apparatus 100 of this embodiment can provide convenience that enables the user 900 to, for example, easily bring it into a train.

Figure 4:
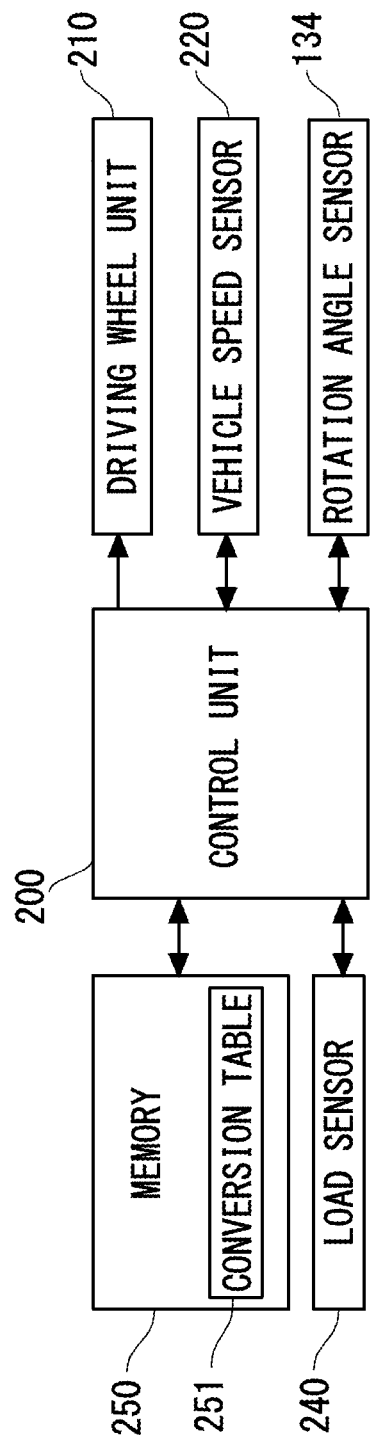
FIG. 4 is a control block diagram of the traveling apparatus according to the first embodiment.

FIG. 4 is a control block diagram of the traveling apparatus 100. A control unit 200 is, for example, a CPU and accommodated inside the body part 122. A driving wheel unit 210 includes a driving circuit and a motor for driving the rear 102, which are driving wheels. The driving wheel unit 210 is accommodated inside the body part 122. The control unit 200 sends driving signals to the driving wheel unit 210 to thereby control the rotations of the rear wheels 102.

The vehicle speed sensor 220 monitors an amount of the rotation of the rear wheels 102 or wheel axis 103 and detects the speed of the traveling apparatus 100. In response to a request from the control unit 200, the vehicle speed sensor 220 sends a result of the detection in a speed signal to the control unit 200. The rotation angle sensor 134 detects the rotation angle θ in the manner described above. In response to a request from the control unit 200, the rotation angle sensor 134 sends a result of the detection in a rotation angle signal to the control unit 200.

A load sensor 240 is, for example, a piezoelectric film that detects a load applied on the step 141, and is embedded in the step 141.

In response to a request from the control unit 200, the load sensor 240 sends a result of the detection in a load signal to the control unit 200.

A memory 250 is a non-volatile storage medium and is, for example, a solid state drive. The memory 250 stores not only a control program for controlling the traveling apparatus 100 but also various parameter values, functions, lookup tables, and the like used for the control. The memory 250 stores a conversion table 251 for converting a rotation angle into a target speed.

Figures 5, 6:
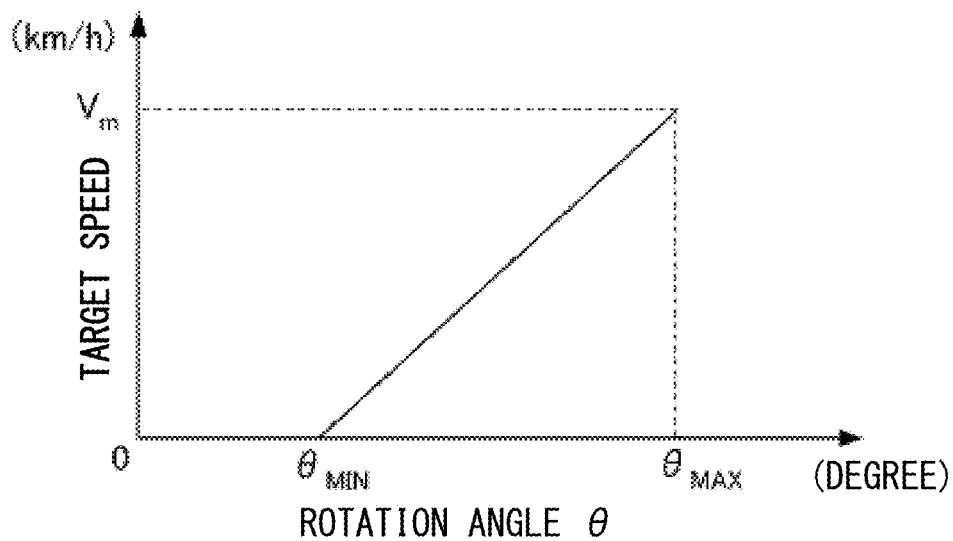
FIG. 5 is a graph showing a relationship between a rotation angle and a target speed.
FIG. 6 is a table showing a relationship between the rotation angle and target speed according to another example.

FIG. 5 is a graph showing a relationship between the rotation angle θ and target speed as an example of the conversion table 251 for converting a rotation angle θ into a target speed. As shown in FIG. 5, the target speed is expressed as a linear function of the rotation angle θ. The target speed is configured to become greater as the rotation angle θ increases. The target speed is zero at the minimum angle $\theta_{MIN}$ (degree), and the target speed is $V_m$(km/h) at the maximum angle $\theta_{MAX}$ (degree). In this way, the conversion table 251 may be in the form of a function.

FIG. 6 is a table showing a relationship between the rotation angle θ and the target speed as another example of the conversion table 251 for converting a rotation angle θ into a target speed. In the example of FIG. 5, the continuously varying target speed is associated with the continuously varying rotation angle θ. In the example of FIG. 6, the continuously varying rotation angle θ is divided into a plurality of groups, and one target speed is associated with each group.

As shown in FIG. 6, the target speed 0 (km/h) is associated with the group of rotation angle θ in the range between $\theta_{MIN}$ or greater and less than $\theta_1$, the target speed 5.0 (km/h) is associated with the group of rotation angle θ in the range between $\theta_1$ or greater and less than $\theta_2$, the target speed 10.0 (km/h) is associated with the group of rotation angle θ in the range between $\theta_2$ or greater and less than $\theta_3$, and the target speed 15.0 (km/h) is associated with the group of rotation angle θ in the range between $\theta_3$ or greater and less than $\theta_{MAX}$. The conversion table 251 in this case can employ the lookup table format. Like in the above example, when the target speed is associated with a somewhat broad range of the rotation angles θ, the target speed will not change little by little, for example, as a result of being affected by swinging of the user 900's body, and it is thus expected that the speed will be smoothly changed. It is obvious that hysteresis may be included in the boundaries between the ranges of the above rotation angles, and by setting different boundaries of the ranges of these angles at the time of acceleration and deceleration, it is expected that the speed will be changed more smoothly.

The association between the rotation angle θ and target speed is not limited to the examples of FIGS. 5 and 6, and various other associations may be formed. As an example of the association, the amount of a change in the target speed for the amount of a change in the rotation angle θ may be configured to be small in a low-speed region, while the amount of a change in the target speed for the amount of a change in the rotation angle θ may be configured to be large in a high-speed region. Moreover, in this embodiment, although the conversion table 251 for associating the rotation angle θ, which is a parameter, with the target speed because the rotation angle θ corresponds one-to-one to the WB length is employed, a conversion table for associating the WB length with the target speed according to the original purpose of the conversion table may be employed instead. In this case, a rotation angle θ obtained by the rotation angle sensor 134 may be converted into a WB length by using the above function, and the conversion table may be referred to.

Figure 7:
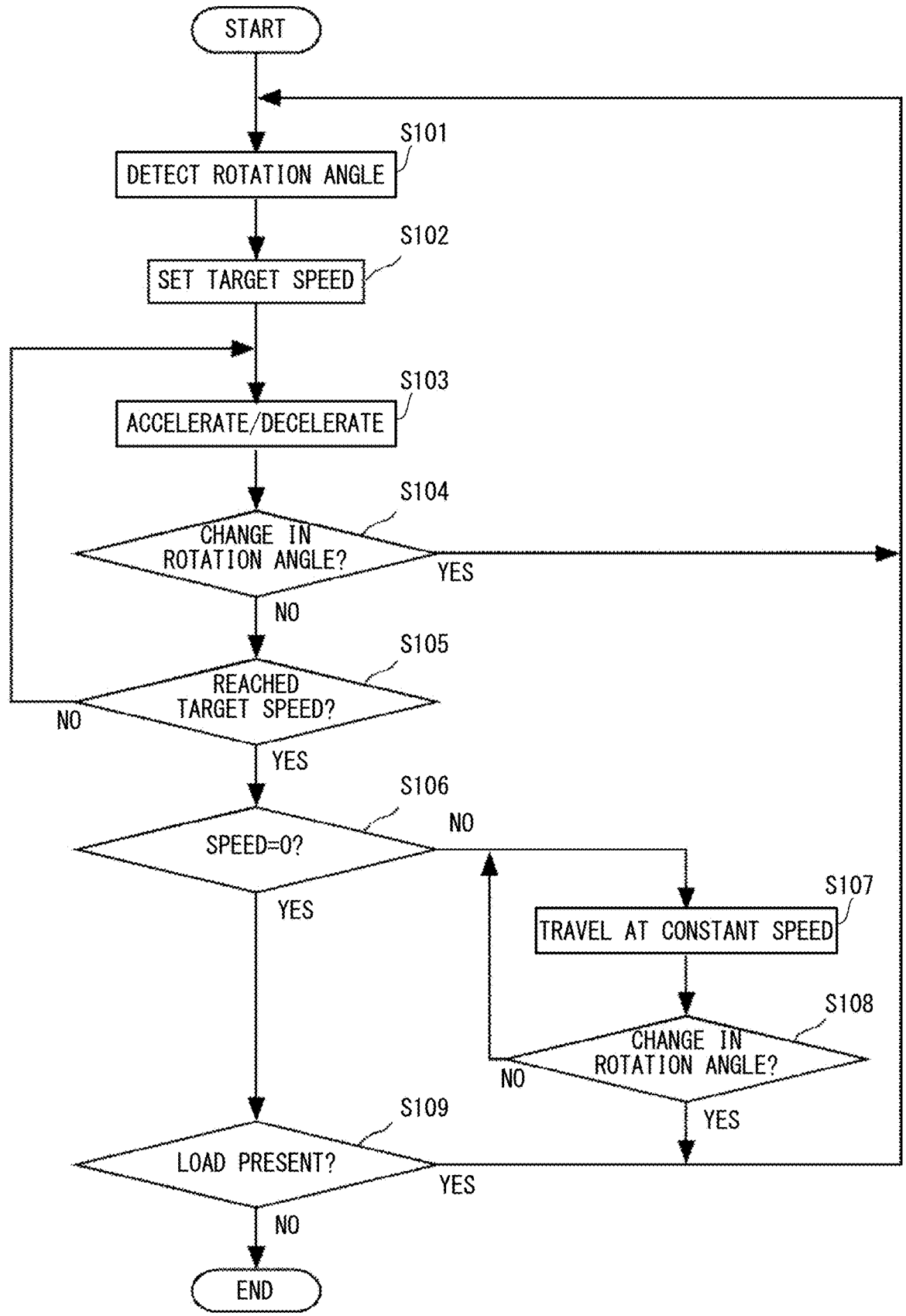
FIG. 7 is a flowchart showing a process while the traveling apparatus is traveling.

Next, a traveling process according to this embodiment will be described. FIG. 7 is a flowchart showing a process performed while the traveling apparatus 100 is traveling. The flow starts when a power switch is turned on and a signal indicating that a load is present is received from the load sensor 240, i.e., when the user 900 rides on the traveling apparatus 100.

In Step S101, the control unit 200 obtains the rotation angle signal from the rotation angle sensor 134 and calculates the current rotation angle θ. In Step S102, the calculated rotation angle θ is applied to the conversion table 251, which has been read out from the memory 250, to set the target speed.

When the control unit 200 sets the target speed, it proceeds to Step S103 and sends a driving signal for acceleration or deceleration to the driving wheel unit 210. Specifically, the control unit 200 firstly receives the speed signal from the vehicle speed sensor 220 and checks the current speed. If the target speed is greater than the current speed, the control unit 200 sends the driving signal for acceleration to the driving wheel unit 210, whereas if the target speed is less than the current speed, the control unit 200 sends the driving signal for deceleration to the driving wheel unit 210.

The control unit 200 monitors whether or not the rotation angle θ has changed during acceleration or deceleration, that is, whether or not the user 900 has tilted the handlebar 115 forward or backward (Step S104). If the control unit 200 determines that the rotation angle θ has changed, it starts the process from Step S101 again. If the control unit 200 determines that the rotation angle θ has not changed, it proceeds to Step S105. Note that when the conversion table shown in FIG. 6 is employed, if changes in the rotation angle θ are within one range, it is determined that the rotation angle θ has not changed.

In Step S105, the control unit 200 receives the speed signal from the vehicle speed sensor 220 and evaluates as to whether or not the current speed has reached the target speed. If the control unit 200 determines that the current speed has not reached the target speed, it returns to Step S103, and the acceleration or deceleration is continued. If the control unit 200 determines that the current speed has reached the target speed, it proceeds to Step S106. In Step S106, the control unit 200 checks whether or not the target speed is zero. If the target speed is zero, it means that the traveling apparatus 100 is stopped at the time of Step S106. Otherwise, the traveling apparatus 100 is traveling at the target speed, and thus the control unit 200 sends, to the driving wheel unit 210, the driving signal for maintaining the traveling apparatus 100 to travel at the speed (Step S107).

Even while the traveling apparatus 100 is traveling at a constant speed in Step S107, the control unit 200 monitors whether or not the rotation angle θ has changed, that is, whether or not the user 900 has tilted the handlebar 115 forward or backward (Step S108). If the control unit 200 determines that the rotation angle θ has changed, it returns to Step S101. If the control unit 200 determines that the rotation angle θ has not changed, it returns to Step S107 to continue traveling at the constant speed.

If the control unit 200 confirms that the target speed is zero in Step S106, it proceeds to Step S109 and evaluates whether the user 900 gets off the traveling apparatus 100 based on the load signal received from the load sensor 240. If the control unit 200 determines that the user 900 has not got off the traveling apparatus 100, i.e., determines that a load is present, it returns to Step S101 to continue the travel control. If the control unit 200 determines that the user 900 has got off the traveling apparatus 100, the series of operations is ended.

Next, second to eighth embodiments as modified examples of the traveling apparatus 100 will be described in order. These modified examples slightly differ from the traveling apparatus 100 in the hardware configuration but are the same as the traveling apparatus 100 in that an angle formed by the front wheel supporting member 110 and rear wheel supporting member 120 is changed by an action of the user 900 who is an occupant, so that the WB length is adjusted. The configuration of the control block and the processing flow of these modified examples are the same as those described with reference to FIGS. 4 to 7 except when particularly described. Thus, in the following description, the difference in the hardware configuration will be mainly focused on. The elements of the traveling apparatus 100 according to these modified examples of the second to eighth embodiments serving the same function as those of the traveling apparatus 100 of the first embodiment are denoted by the same reference signs as those in the first embodiment. The descriptions of such elements will be thus omitted in these modified examples.

Figure 8:
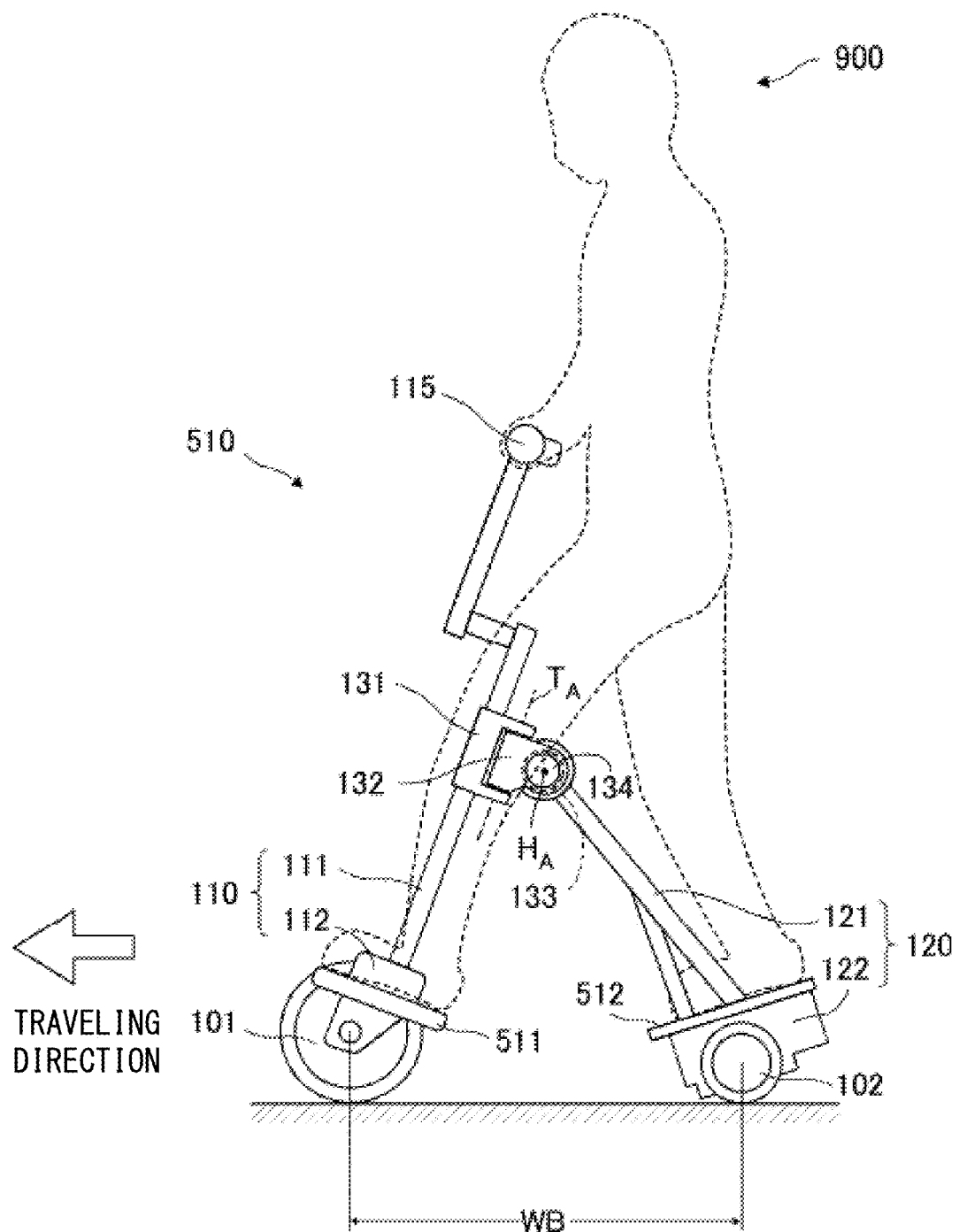
FIG. 8 is a lateral overview diagram of a traveling apparatus according to a second embodiment when it travels at a high speed.

FIG. 8 is a lateral overview diagram of a traveling apparatus 510 according to the second embodiment when it travels at a high speed. In the traveling apparatus 100 according to the first embodiment, the step 141 for the user 900 to place his/her feet on is provided on the upper surface of the body part 122. However, the traveling apparatus 510 includes front steps 511 on side surfaces of the fork 112. The traveling apparatus 510 further includes rear steps 512 on the top surface of the body part 122. The user 900 places one of his/her left and right feet on the front step 511 and places the other on the rear step 512. FIG. 8 shows a state in which the user 900 places his/her left foot on the front step 511 and his/her right foot on the rear step 512. The front steps 511 are provided on both sides of the fork 112 with respect to the traveling direction, and the rear steps 512 are provided on both sides of the top surface of the body part 122 so that, conversely to the above-described example, the user 900 can place his/her right foot on the front step 511 and his/her left foot on the rear step 512.

In this way, if a style in which the user 900 rides with his/her left and right feet spreading forward and backward is employed in the traveling apparatus, the user 900 can change the angle formed by the front wheel supporting member 110 and rear wheel supporting member 120 not only by weighting the handlebar 115 in the forward and backward directions but also by an action of spreading and closing his/her feet forward and backward. Further, since the user 900's feet are spread forward and backward, the center of gravity of the user 900 in the traveling direction is located between the front wheel 101 and rear wheels 102. This enables the user 900 to stably maintain his/her balance when he/she rides on the traveling apparatus 510.

Further, as the biasing spring 133 acts in a direction in which the angle formed by the front wheel supporting member 110 and rear wheel supporting member 120 is made small, the user 900's feet will not unexpectedly spread to thereby increase the speed. Furthermore, since the user 900 applies a force against the biasing force of the biasing spring 133 when spreading his/her feet forward and backward, the traveling apparatus 510 has high user familiarity as an interface for extending the WB length to accelerate the traveling apparatus 510.

Note that a contacting member to be in contact with one of the user 900's feet to be placed on the front step is not limited to the front steps 511 provided on the side surfaces of the fork 112 and may have any shape or structure as long as it receives a weight from his/her foot placed on the front step and transmits the weight to the front wheel supporting member 110. For example, a knee rest part may be provided on the front pole 111, and the user 900 may press his/her knees against the knee rest part to push the front wheel supporting member 110 forward. Likewise, a contacting member to be in contact with one of the user 900's feet to be placed on the rear step is not limited to the rear steps 512 provided on the top surface of the body part 122 and may instead have any shape or structure as long as it receives a weight from his/her foot placed on the rear step and transmits the weight to the rear wheel supporting member 120.

Figure 9:
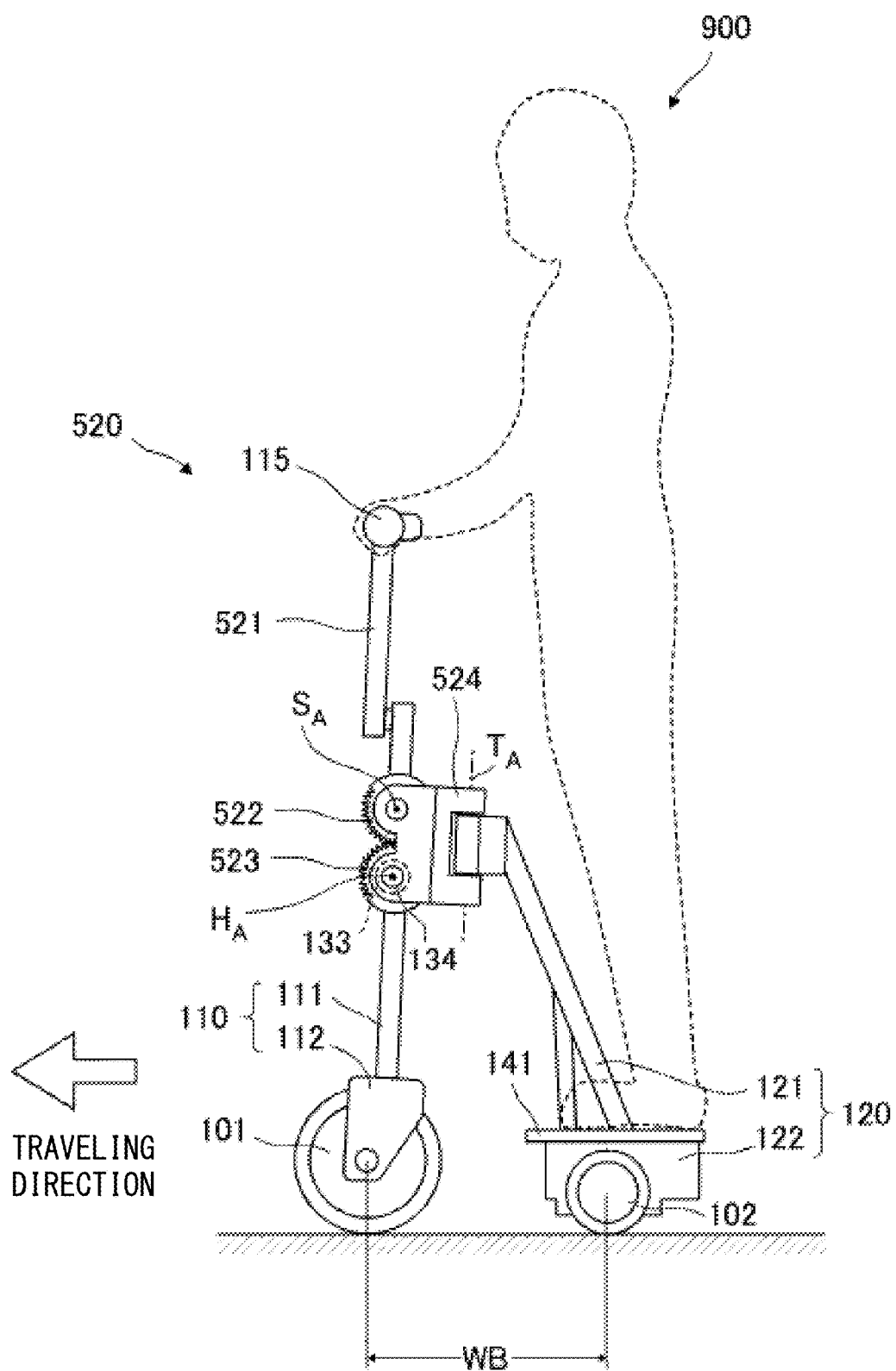
FIG. 9 is a lateral overview diagram of a traveling apparatus according to a third embodiment when it travels at a low speed.

FIG. 9 is a lateral overview diagram of a traveling apparatus 520 according to the third embodiment when it travels at a low speed. In the traveling apparatus 100 according to the first embodiment, when the user 900 tilts the handlebar 115 forward in the traveling direction, the WB length becomes shorter, while when the user 900 tilts the handlebar 115 backward in the traveling direction, the WB length becomes longer. In other words, the handlebar 115 fixed to the front pole 111 is configured to swing forward and backward around a swing axis. The swing axis is the hinge axis HA around which the front pole 111 and rear pole 121 rotate in relation to each other. Further, when the user 900 swings the handlebar 115, the angle formed by the front pole 111 and rear pole 121 is configured to change. In the traveling apparatus 520 according to the third embodiment, when the user 900 tilts the handlebar 115 forward in the traveling direction, the WB length becomes longer, while when the user 900 tilts the handlebar 115 backward in the traveling direction, the WB length becomes shorter. Specifically, the traveling apparatus 520 includes a reversing mechanism. With the reversing mechanism, when the user 900 swings the handlebar 115 in one direction around a swing axis SA, the front wheel supporting member 110 is rotated around the hinge axis HA in a direction opposite to the direction in which the handlebar 115 is swung.

The reversing mechanism includes a handlebar gear 522 fixed to one end of a handlebar pole 521 that fixes and supports the handlebar 115 and a front wheel gear 523 fixed to the other end of the front pole 111, i.e., the end of the front pole 111 opposite to the end of the front pole 111 supporting the fork 112. The front wheel gear 523 is meshed with the handlebar gear 522. The reversing mechanism further includes a pivot joint 524 that rotatably supports the handlebar gear 522 and front wheel gear 523 so that they mesh with each other and are rotated. The pivot joint 524 rotatably supports the handlebar gear 522 so that the handlebar pole 521 can swing around the swing axis $S_A$ that is parallel to the wheel axis of the front wheel 101. The pivot joint 524 rotatably supports the front wheel gear 523 so that the front pole 111 can rotate around the hinge axis $H_A$ that is parallel to the wheel axis of the front wheel 101.

Further, the pivot joint 524 is pivotally arranged on the other end of the rear pole 121 that constitutes the rear wheel supporting member 120, i.e., the end of the rear pole 121 opposite to the end of the rear pole 121 supported by the body part 122. The pivot joint 524 rotates in relation to the rear pole 121 around the pivot axis $T_A$ that is configured to include a vertical component. The handlebar gear 522 and front wheel gear 523 are, for example, wide spur gears having high rigidity meshing with each other. When the user 900 turns the handlebar 115 around the pivot axis $T_A$, an acting force of the handlebar gear 522 and front wheel gear is transmitted to the front wheel supporting member 110, so that the orientation of the front wheel 101 can be changed.

The biasing spring 133 and rotation angle sensor 134 are provided on both sides of the hinge axis $H_A$. The biasing spring 133 acts in a direction in which the angle formed by the front pole 111 and rear pole 121 is made small. The rotation angle sensor 134 detects the angle formed by the front pole 111 and rear pole 121.

Figure 10:
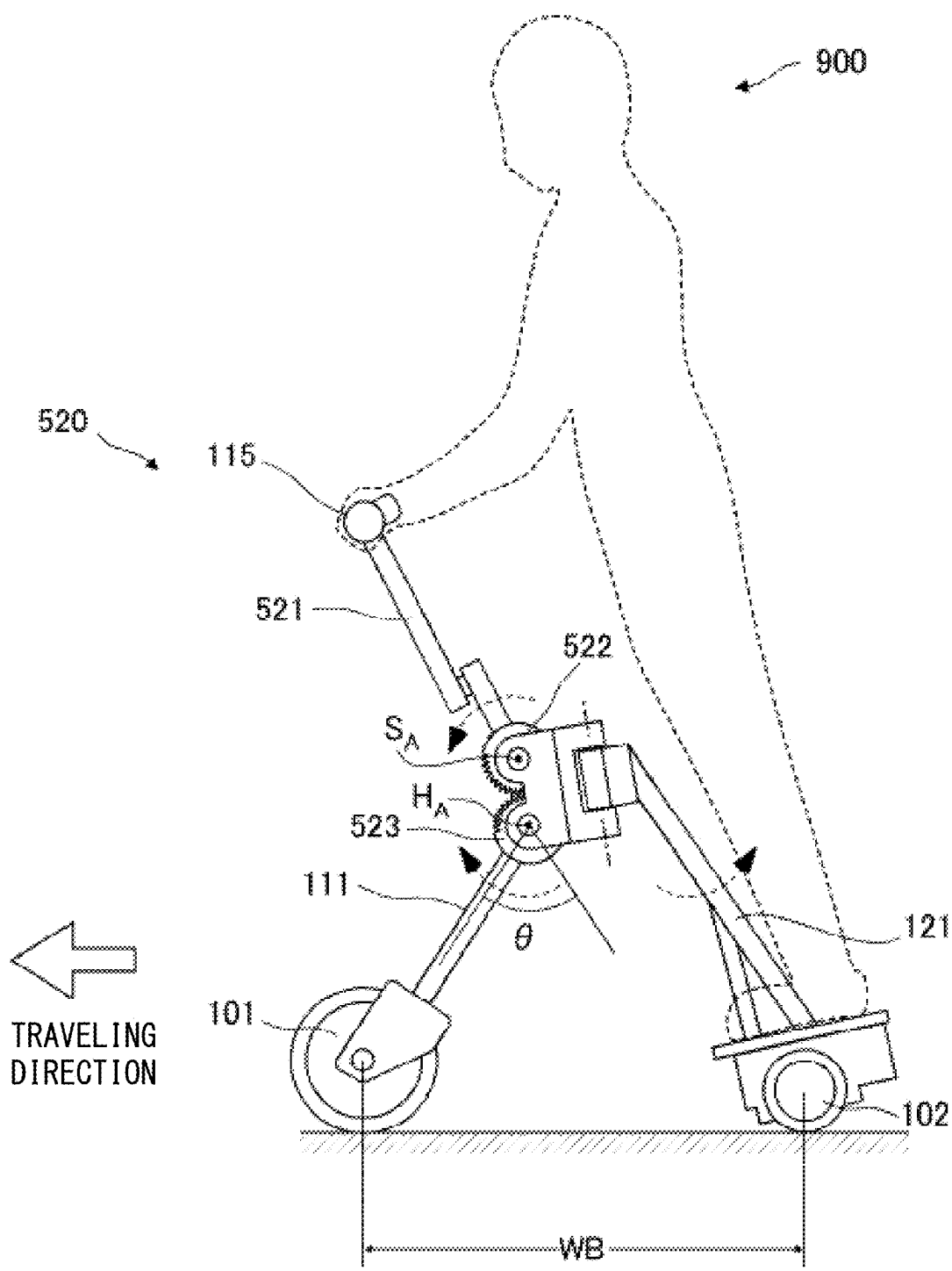
FIG. 10 is a lateral overview diagram of the traveling apparatus according to the third embodiment when it travels at a high speed.

FIG. 10 is a lateral overview diagram of a traveling apparatus 520 according to the third embodiment when it travels at a high speed. When the user 900 tilts the handlebar 115 forward in the traveling direction in the state shown in FIG. 9, the handlebar pole 521 swings around the swing axis $S_A$, and the front pole 111 rotates around the hinge axis $H_A$ in a direction opposite to the direction in which the handlebar pole 521 is swung. Then, as shown in FIG. 10, the front wheel 101 is pushed toward the traveling direction, the angle θ formed by the front pole 111 and rear pole 121 increases, and the WB length becomes longer. As described above, when the WB length becomes longer, the target speed is configured to be great, and thus the traveling apparatus 520 travels faster.

In this way, when the handlebar 115 is configured to be gradually tilted forward, the faster the traveling apparatus 520, the more forwardly a tilted posture the user 900 takes. However, when the handlebar 115 is tilted forward, the WB length becomes longer, thus the center of gravity of the user 900 is always located around an intermediate point between the front wheel 101 and rear wheels 102. Consequently, the user 900 can drive while stably maintaining his/her balance when the traveling apparatus 520 is traveling at low and high speeds.

Note that although the traveling apparatus 520 employs a mechanism, as the reversing mechanism, in which the handlebar gear 522 and front wheel gear 523 mesh with each other and rotate in directions opposite to each other, the traveling apparatus 520 may employ various other mechanisms. The reversing mechanism may be any mechanism as long as it is one in which, when the user 900 swings the handlebar 115 around the swing axis $S_A$, the front wheel supporting member 110 is rotated around the hinge axis $H_A$ in a direction opposite to the direction in which the handlebar 115 is swung. For example, the handlebar pole 521 and front pole 111 may be connected by a four-bar linkage mechanism.

Moreover, in the traveling apparatus 520, when the handlebar 115 is tilted forward and backward, the pivot axis $T_A$ also changes. However, for example, a universal joint may be provided at an intermediate part of the handlebar pole 521, so that the rotation direction of the handlebar 115 can be kept constant regardless of the traveling speed. Alternatively, a mechanism for enabling the pivot axis $T_A$ to stay vertical may be provided on the rear pole 121.

Figure 11:
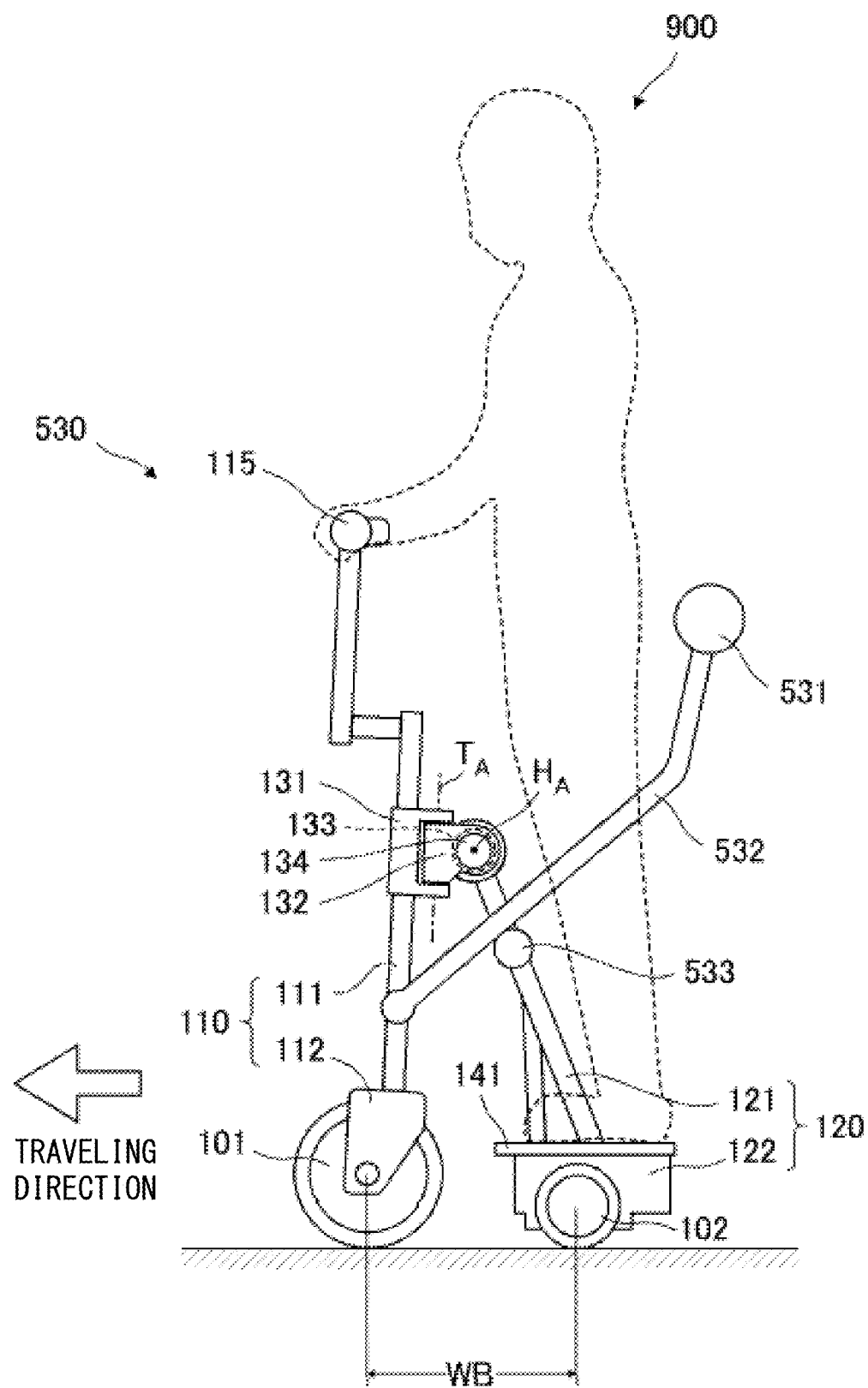
FIG. 11 is a lateral overview diagram of a traveling apparatus according to a fourth embodiment when it travels at a low speed.
Figure 12:
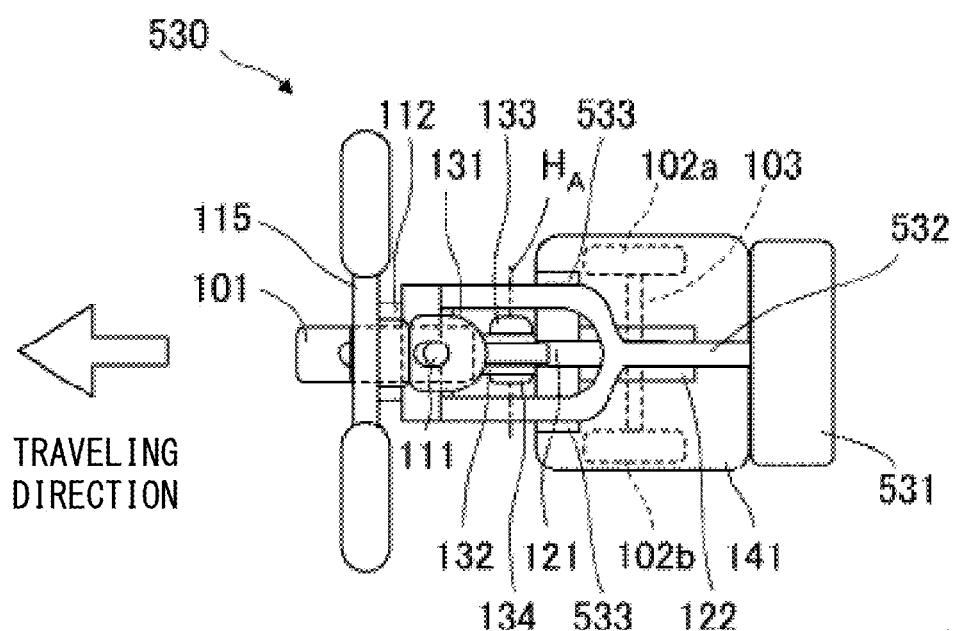
FIG. 12 is a top overview diagram of the traveling apparatus according to the fourth embodiment.

FIG. 11 is a lateral overview diagram of a traveling apparatus 530 according to the fourth embodiment when it travels at a low speed. FIG. 12 is a top lateral diagram as viewed from above the traveling apparatus 530 that is in the state shown in FIG. 11. In FIG. 12, the user 900, who is illustrated by the dotted line in FIG. 11, is not shown. The traveling apparatus 530 differs from the traveling apparatus 100 according to the first embodiment in that it includes a pressing bar 531, a pressing-down pole 532, and an action pin 533.

The pressing-down pole 532 is a coupling member that is fixedly coupled to the front pole 111 in such a way that bifurcated front ends of the pressing-down pole 532 sandwich the front pole 111 on both sides of the front pole 111. When viewed from the top, the pressing-down pole 532 is disposed in such a way that the Y-shaped bifurcated parts are integrally formed and spaced apart from the rear pole 121 to surround the rear pole 121. When viewed from the side, the pressing-down pole 532 is extended obliquely upward from the front ends thereof fixed to the front pole 111 toward a rear end thereof. The stick-like pressing bar 531 is attached to the rear end of the pressing-down pole 532 in a direction parallel to a traveling surface and orthogonal to the traveling direction.

Since the bifurcated parts of the pressing-down pole 532 are spaced apart from the rear pole 121, even when the front wheel supporting member 110 is rotated around the pivot axis $T_A$ within a certain range, the rear pole 121 and pressing-down pole 532 will not interfere with each other. Further, as the rear end of the pressing-down pole 532 is integrally formed, the user 900 can ride on the step 141 across the pressing-down pole 532.

The action pin 533 is provided so as to protrude toward both sides from around an intermediate point between ends of the rear pole 121. The action pin 533 is in contact with a bottom surface of the bifurcated parts of the pressing-down pole 532.

Figure 13:
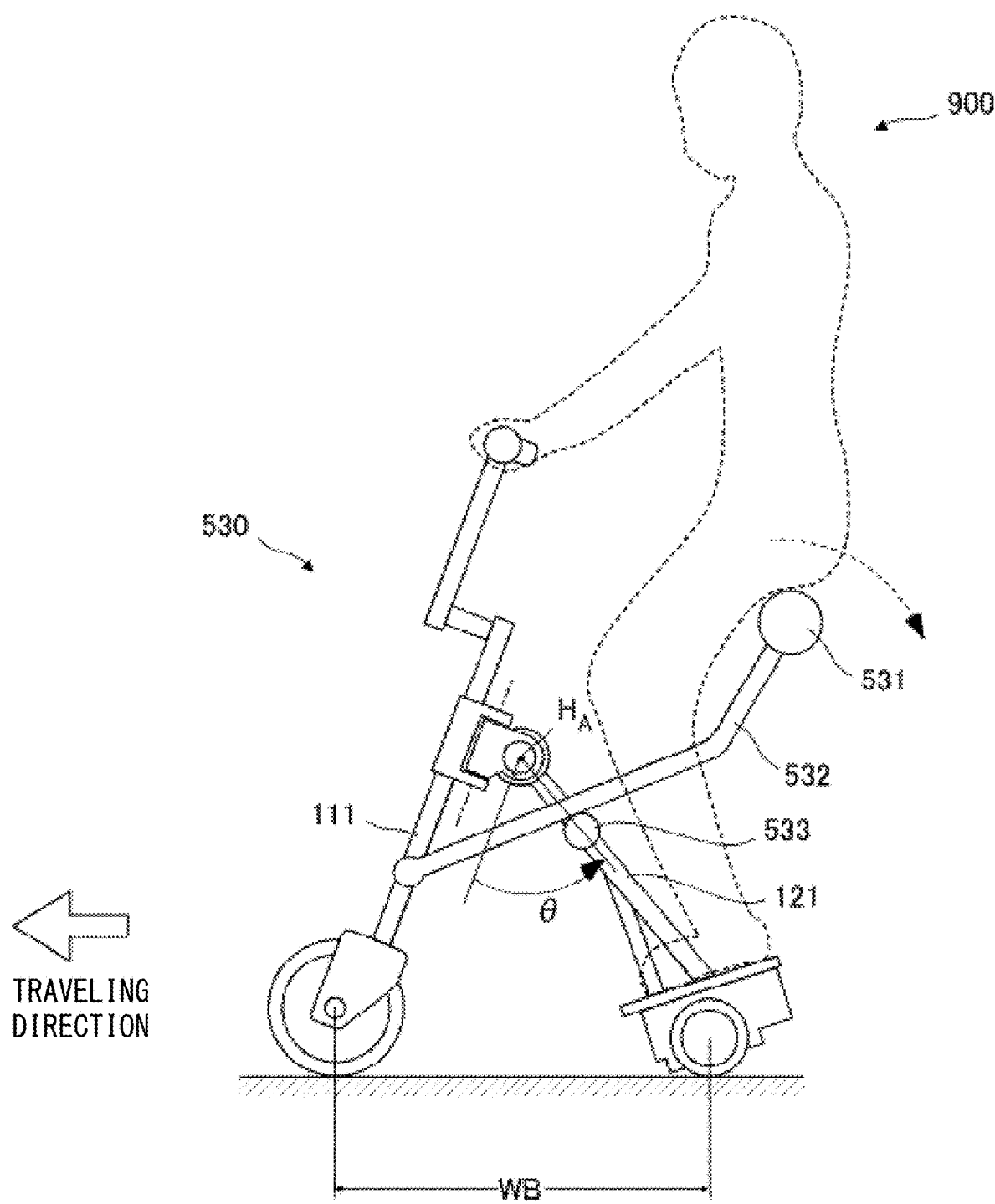
FIG. 13 is a lateral overview diagram of the traveling apparatus according to the fourth embodiment when it travels at a high speed.

FIG. 13 is a lateral overview diagram of the traveling apparatus 530 according to the fourth embodiment when it travels at a high speed. When the user 900 presses down the pressing bar 531 on his/her back part such as his/her buttocks or back in the state shown in FIG. 12, a pressing-down force of his/her back part is transmitted to the front pole 111 to push the front wheel 101 forward. Further, while the pressing-down pole 532 is brought into contact with the action pin 533 and relatively slides, the action pin 533 is pressed down, and the rear pole 121 pushes the rear wheels 102 relatively backward. Such an action increases the formed angle θ and WB length. As described above, when the WB length becomes longer, the target speed is configured to be great, and thus the traveling apparatus 530 travels at a higher speed. That is, the user 900 can change the WB length, and eventually, adjust the traveling speed by adjusting the pressing force of his/her back part on the pressing bar 531. According to such a configuration, the user 900 can drive the traveling apparatus 530 with a feeling of an intuitive operation. Note that the pressing bar 531 is not limited to a stick-like shape as long as it receives the pressing force from a user's back part. The pressing bar 531 may be formed in a curved shape conforming to a user's buttocks and back.

Figure 14:
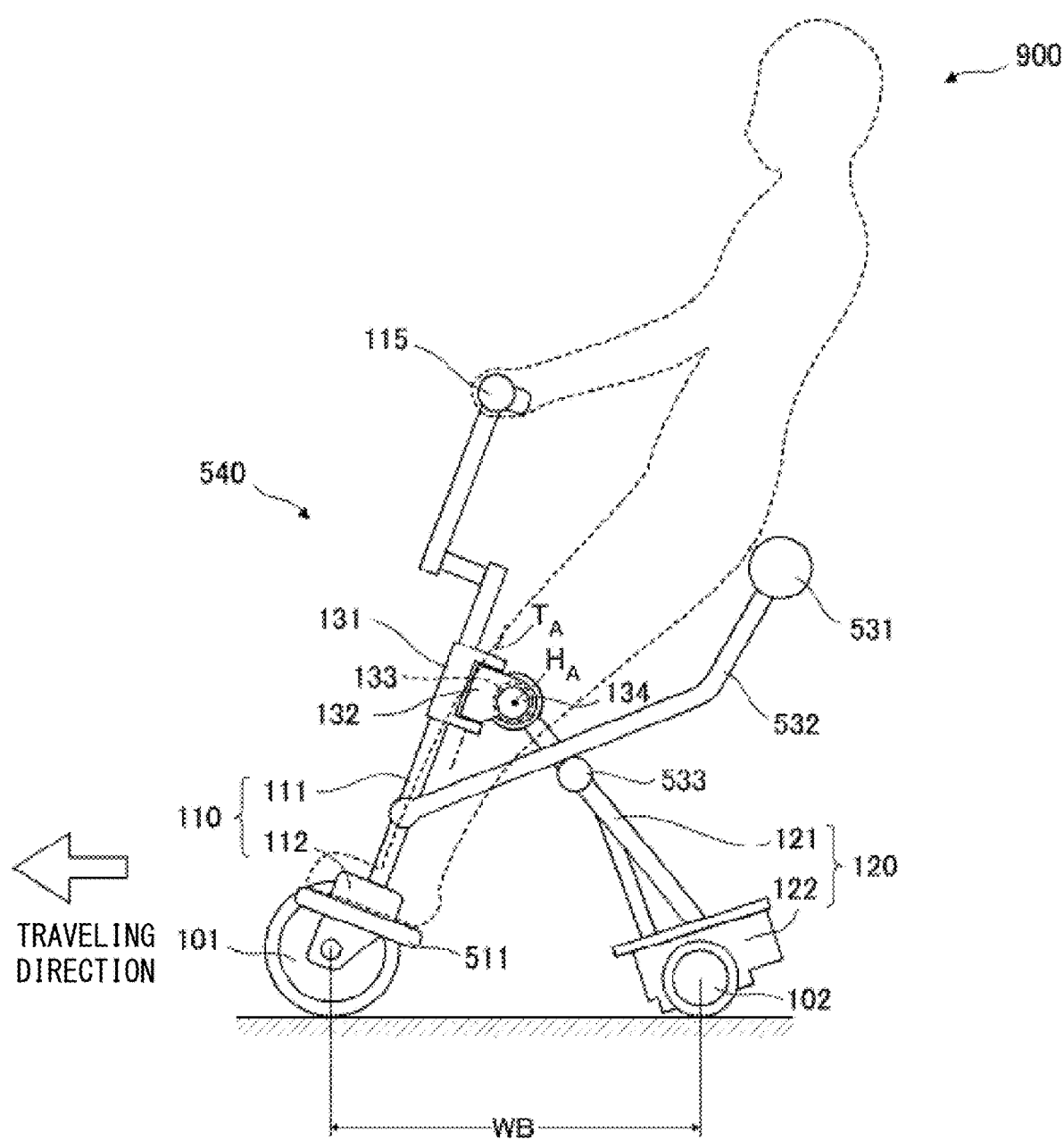
FIG. 14 is a lateral overview diagram of a traveling apparatus according to a fifth embodiment when it travels at a high speed.

FIG. 14 is a lateral overview diagram of a traveling apparatus 540 according to the fifth embodiment when it travels at a high speed. The traveling apparatus 540 further includes the front step 511, which is provided in the traveling apparatus 510 according to the second embodiment, in the traveling apparatus 530 according to the fourth embodiment. In the traveling apparatus 540, the user 900 places his/her feet on the front step 511. Then, by pressing down the pressing bar 531 on the user 900's back part, the rear wheels 102 are relatively pushed backward. Like the above-described configuration, with this configuration, the user 900 can drive the traveling apparatus 530 with a feeling of an intuitive operation.

Figure 15:
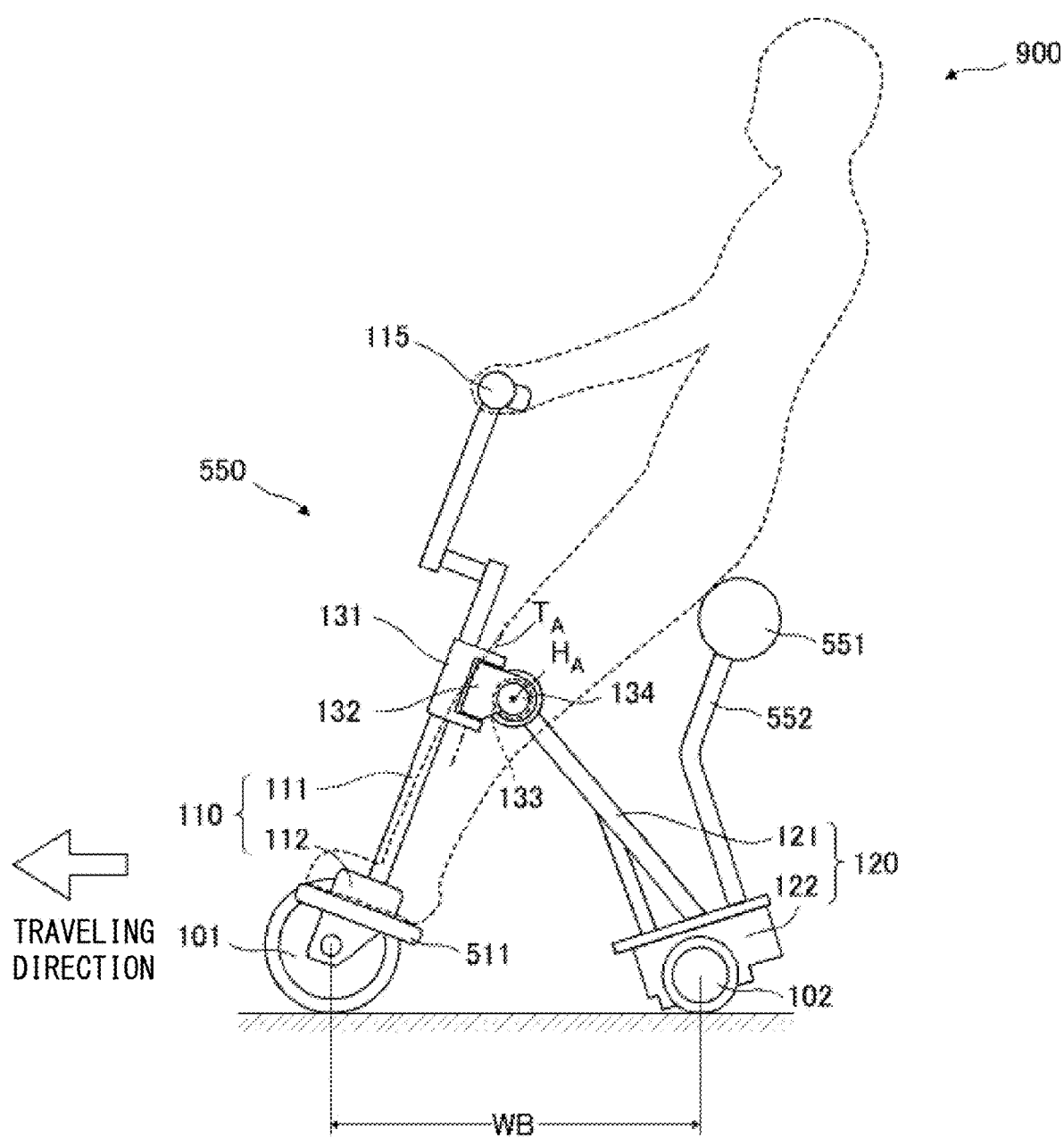
FIG. 15 is a lateral overview diagram of a traveling apparatus according to a sixth embodiment when it travels at a high speed.

FIG. 15 is a lateral overview diagram of a traveling apparatus 550 according to the sixth embodiment when it travels at a high speed. The traveling apparatus 550 further includes a seating part 551 in the traveling apparatus 510 according to the second embodiment. One end of a seating pole 552 is fixed to the body part 122. The seating part 551 is fixed to the other end of the seating pole 552. The user 900 places his/her feet on the front step 511 and sits on the seating part 551. When the user 900 attempts to increase the WB length, he/she extends his/her feet to weight the front step 511 and pushes the front wheel 101 forward. Then, when the WB length becomes long, as described above, the target speed is configured to be great, and thus the traveling apparatus 550 travels at a higher speed. When the user 900 weights less the front step 511, the front wheel 101 is pulled back by the action of the biasing spring 133 to thereby reduce the WB length. Such a configuration is advantageous for riding for a long time because the user 900 can sit while driving.

Figure 16:
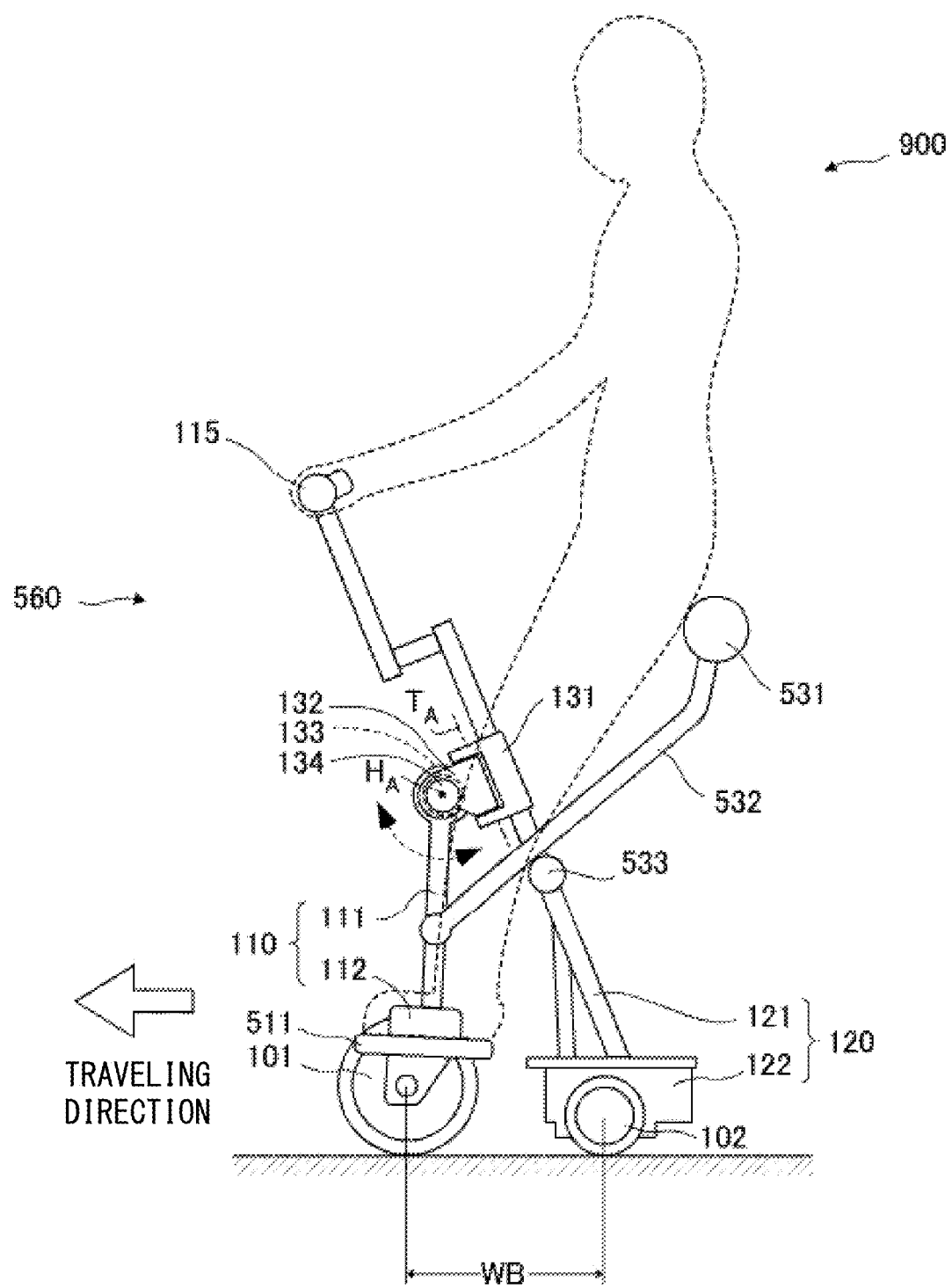
FIG. 16 is a lateral overview diagram of a traveling apparatus according to a seventh embodiment when it travels at a low speed.

FIG. 16 is a lateral overview diagram of the traveling apparatus 560 according to the seventh embodiment when it travels at a low speed. In the traveling apparatus 540 according to the fifth embodiment, the pressing-down pole 532 is coupled to the front wheel supporting member 110, and the pressing bar 531 is attached to the pressing-down pole 532. Further, the handlebar 115 is formed integrally with the front wheel supporting member 110. That is, the handlebar 115, front wheel supporting member 110, and pressing bar 531 are integrally formed and rotate in relation to one another around the hinge axis $H_A$ with respect to the rear wheel supporting member 120. In the traveling apparatus 560, the front wheel supporting member 110 and pressing bar 531 are integrally formed, and the rear wheel supporting member 120 and handlebar 115 are integrally formed. The front wheel supporting member 110 and pressing bar 531 rotate in relation to each other around the hinge axis $H_A$ with respect to the rear wheel supporting member 120 and handlebar 115.

The user 900 places his/her feet on the front step 511 to maintain his/her balance. The user 900 presses the pressing bar 531 on his/her back part to press down the pressing-down pole 532. Then, while the pressing-down pole 532 is brought into contact with the action pin 533 and relatively slides, the action pin 533 is pressed down, and the rear pole 121 presses the rear wheels 102 relatively backward. Such an action increases the formed angle θ and WB length. As described above, when the WB length becomes longer, the target speed is configured to be great, and thus the traveling apparatus 530 travels at a higher speed.

In the traveling apparatus 560, the pressing bar 531 and pressing-down pole 532 that are coupled to the front wheel supporting member 110 and weighted by the user 900's back part are connected with the handlebar 115 coupled to the rear wheel supporting member 120 with the hinge axis $H_A$ interposed therebetween. Like the traveling apparatus 540 according to the fifth embodiment, the traveling apparatus 560 is achieved by a simple component configuration.

In the traveling apparatus 560, when the handlebar 115 is turned, the rear wheel supporting member 120 rotates around the pivot axis $T_A$, and an orientation of the rear wheels 102 is changed. In order to perform the turning operation with a lighter force, the rear wheels 102 may be used as trailing wheels, and the front wheel 101 may be used as a driving wheel.

Figure 17:
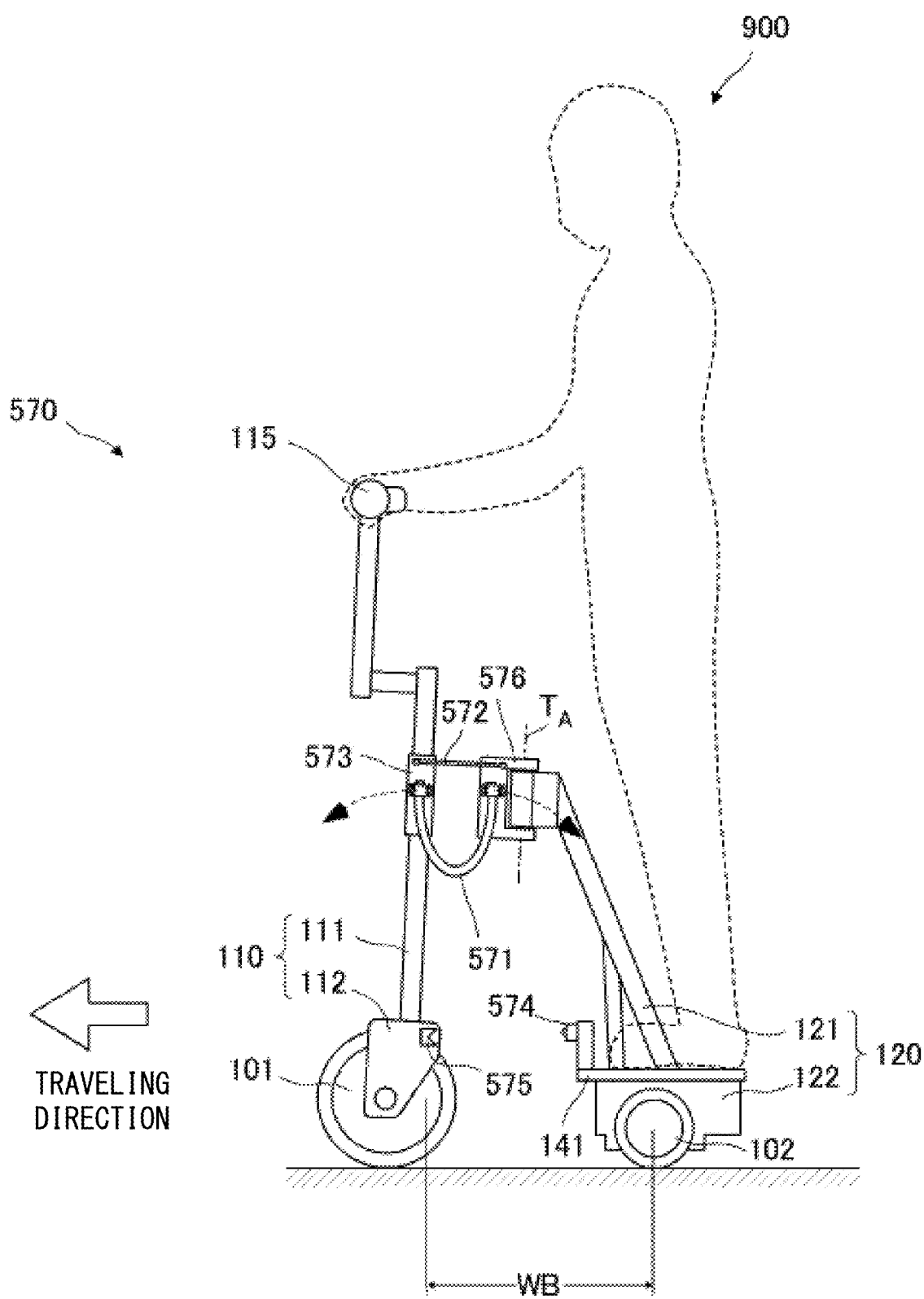
FIG. 17 is a lateral overview diagram of a traveling apparatus according to an eighth embodiment when it travels at a low speed.

FIG. 17 is a lateral overview diagram of the traveling apparatus 570 according to the eighth embodiment when it travels at a low speed. The traveling apparatuses of the respective embodiments described so far employ a configuration in which the front wheel supporting member 110 and rear wheel supporting member 120 rotate in relation to each other around the hinge axis. In the traveling apparatus 570, a connection part including a leaf spring 571 and a wire 572 is used in place of the hinge axis.

A pivot joint 576 is pivotally arranged on the other end of the rear pole 121 that constitutes the rear wheel supporting member 120, i.e., the end of the rear pole 121 opposite to the end of the rear pole 121 supported by the body part 122. The pivot joint 576 rotates in relation to the rear pole 121 around the pivot axis $T_A$ that is configured to include a vertical component. An attachment member 573 is fixed around an upper part of the front pole 111 that constitutes the front wheel supporting member 110. The pivot joint 576 and attachment member 573 face each other in the traveling direction. The leaf spring 571 and wire 572 are suspended from and fixed to sides of the pivot joint 576 and attachment member 573.

As shown in FIG. 17, the leaf spring 571 is bent in a U-shape that opens upward when viewed from the side and fixed. Thus, a biasing force is exerted on the leaf spring 571 in a direction in which the angle formed by the front pole 111 and rear pole 121 is reduced. On the other hand, the wire 572 is extended by the biasing force of the leaf spring 571 to thereby prevent the angle formed by the front pole 111 and rear pole 121 from becoming smaller than a certain angle. Further, the leaf spring 571 has high rigidity in a wheel axis direction of the front wheel 101, and when the handlebar 115 is turned, the pivot joint 576 can be rotated around the pivot axis $T_A$.

The WB length is detected by a distance sensor 574 provided on the body part 122. The distance sensor 574 is, for example, a laser distance meter, that receives reflected light that is retroreflected by a corner cube 575 provided on the fork 112 to detect the WB length.

Figure 18:
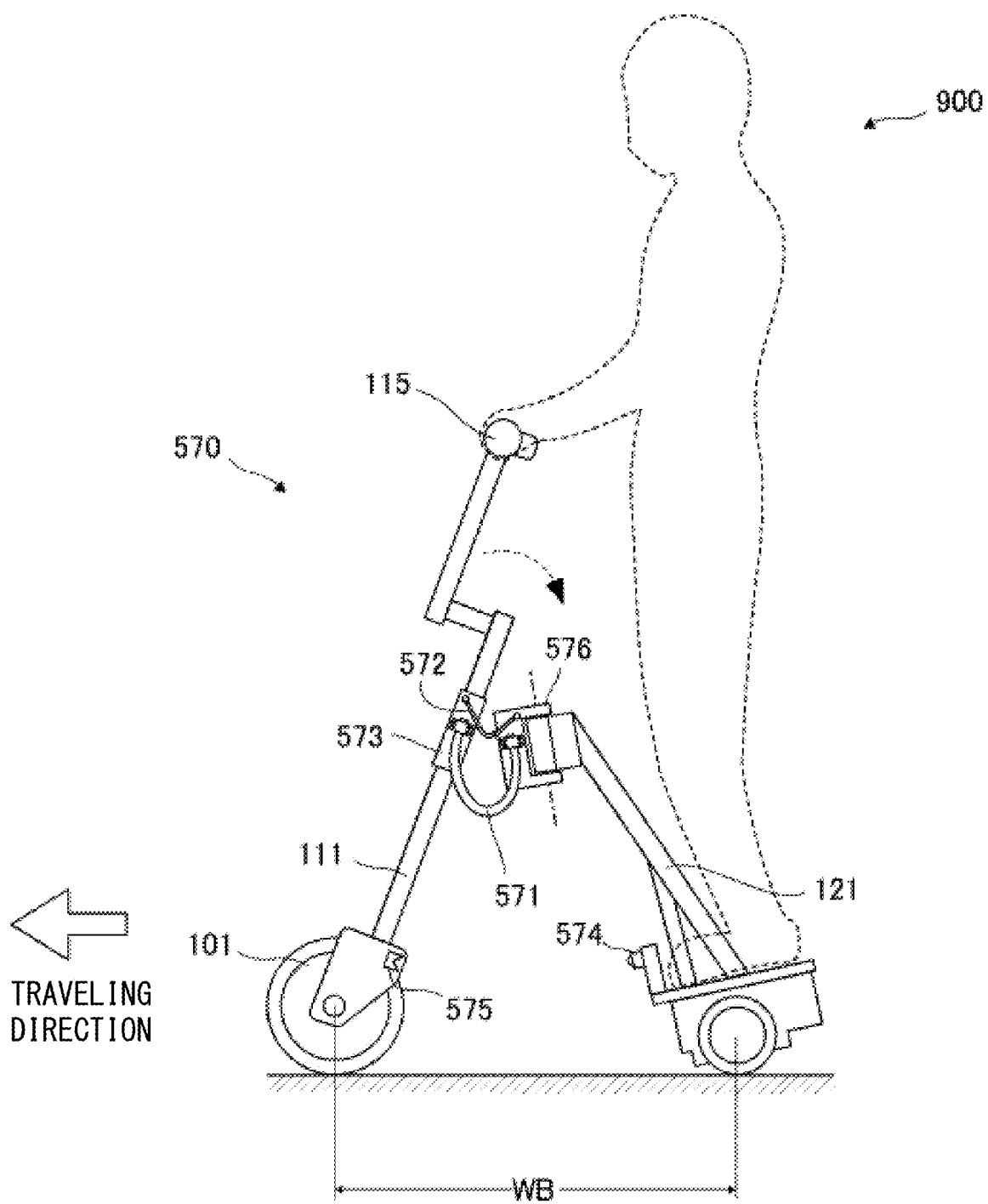
FIG. 18 is a lateral overview diagram of the traveling apparatus according to the eighth embodiment when it travels at a high speed.

FIG. 18 is a lateral overview diagram of the traveling apparatus 570 according to the eighth embodiment when it travels at a high speed. When the user 900 tilts the handlebar 115 backward against the biasing force of the leaf spring 571 in the state shown in FIG. 17, the front wheel 101 is pushed forward and the WB length becomes long. At this time, the wire 572 is slackened between the pivot joint 576 and the attachment member 573. As described above, when the WB length becomes longer, the target speed is configured to be great, and thus the traveling apparatus 570 travels at a higher speed.

In the traveling apparatus 570 configured in this way, a mechanism of a rotation part for adjusting the angle formed by the front wheel supporting member 110 and rear wheel supporting member 120 is not limited to a hinge and may instead be designed as other than a hinge. Note that the rotation part is not limited to the leaf spring 571 and may instead be other elastic members as long as one end thereof is connected to the front wheel supporting member 110, the other end thereof is connected to the rear wheel supporting member 120, and it exerts a biasing force in a direction to reduce the angle formed by the front wheel supporting member 110 and rear wheel supporting member 120. Moreover, such a mechanism of the rotation part may be applied to the traveling apparatuses of the above-described embodiments.

Figure 19:
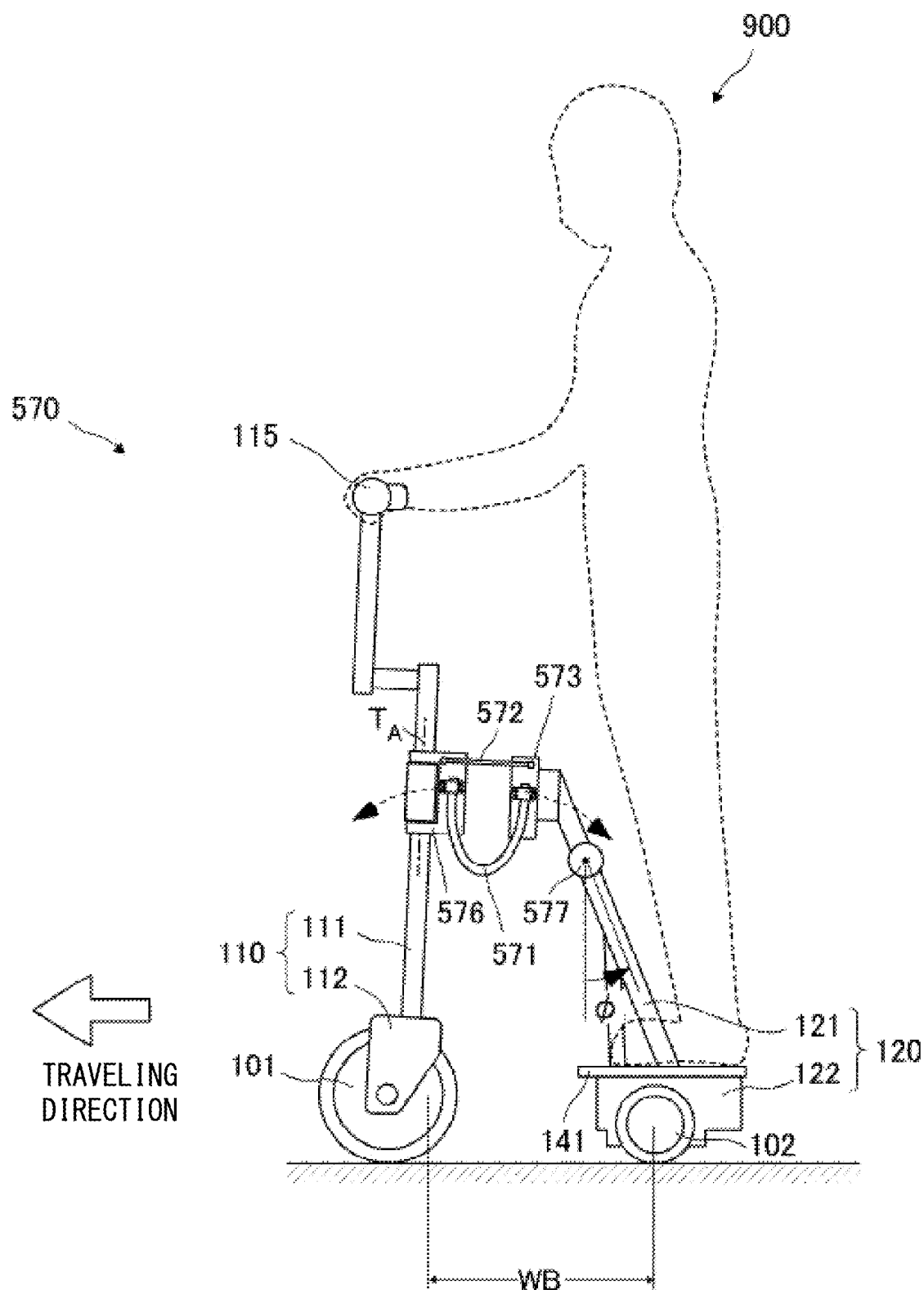
FIG. 19 is a lateral overview diagram of a traveling apparatus according to a modified example of the eighth embodiment.

FIG. 19 is a lateral overview diagram of a traveling apparatus according to a modified example of the eighth embodiment. FIG. 19 corresponds to FIG. 17. In this modified example, the attachment member 573 is provided on the other end of the rear pole 121 i.e., the end of the rear pole 121 opposite to the end of the rear pole 121 supported by the body part 122. Further, the pivot joint 576 is pivotally arranged on the front pole 111. In a manner similar to that in the eighth embodiment, in this modified embodiment, the pivot joint 576 and attachment member 573 face each other in the traveling direction. The leaf spring 571 and wire 572 are suspended from and fixed to the sides of the pivot joint 576 and attachment member 573.

The pivot joint 576 relatively rotates, with respect to the front pole 111, around the pivot axis $T_A$, which is disposed parallel to the direction in which the front pole 111 is extended. By forming the pivot axis in this way, the leaf spring 571 is not rotated when the handlebar 115 is turned, and the pivot axis $T_A$ becomes parallel to the pivot axis of the handlebar 115 that is operated by the user 900. Accordingly, the user 900 can turn the handlebar 115 by a light operation force.

Further, in this modified example, the WB length is not directly detected by the distance sensor and instead an angle sensor 577 for detecting an inclined angle φ of the rear pole 121 with respect to the vertical direction is employed. The inclined angle φ changes in conjunction with the WB length. The angle sensor 577 is, for example, a gravity sensor. Like the above-described rotation angle θ, the inclined angle φ corresponds one-to-one with the WB length. Accordingly, it is possible to perform speed control based on the WB length by detecting the inclined angle φ. Note that the angle sensor 577 may be installed on the front pole 111 to detect the inclined angle of the front pole 111.

Although the embodiments have been described, the front and rear wheels may not be wheels and may instead be ground-contacting elements such as spherical wheels, a crawler, or the like. Moreover, a power source for driving the driving wheels is not limited to a motor and instead may be a gasoline engine or the like. Further, although an example of the control in which the formed angle changing in conjunction with the WB length corresponds one-to-one to the target speed has been described in the above embodiments, various other methods of control may be possible as long as they controls driving based on a parameter that changes in conjunction with the WB length. For example, a maximum speed limit value may be associated with a parameter that changes in conjunction with the WB length, and it may be possible to enable a user to adjust acceleration and deceleration by an accelerator/throttle up to the limit value.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A traveling apparatus including at least, with respect to a traveling direction, a front wheel and a rear wheel and on which a user rides when traveling, the traveling apparatus comprising:
   a front wheel supporting member configured to rotatably support the front wheel;
   a rear wheel supporting member configured to rotatably support the rear wheel;
   a driving unit configured to drive at least one of the front wheel and the rear wheel;
   an adjusting mechanism including a rotation part configured to rotate the front wheel supporting member and the rear wheel supporting member in relation to each other, the adjusting mechanism being configured to adjust a wheel base length between the front wheel and the rear wheel by force generated from an action of the user being transmitted to the front wheel supporting member and the rear wheel supporting member, thereby changing an angle formed by the front wheel supporting member and the rear wheel supporting member; and
   a control unit configured to control the driving unit based on the angle changing in conjunction with the wheel base length so that a speed of the traveling apparatus varies continuously or in a stepwise fashion in accordance with a continuous change of the angle.

2. The traveling apparatus according to claim 1, further comprising a handlebar part configured to rotate the front wheel in a rotating direction and be capable of being swung around a swing axis, the swing axis being parallel to a rotation axis of the rotation part, wherein the adjusting mechanism changes the angle formed by the front wheel supporting member and the rear wheel supporting member by an action of the user to swing the handlebar part around the swing axis.

3. The traveling apparatus according to claim 2, wherein the adjusting mechanism includes a reversing mechanism that, when the user swings the handlebar part in one direction with respect to the swing axis, rotates the front wheel supporting member in another direction opposite to the one direction with respect to the rotation axis.

4. The traveling apparatus according to claim 2, wherein the handlebar part is fixed to the front wheel supporting member, and the swing axis is the same as the rotation axis of the rotation part.

5. The traveling apparatus according to claim 1, further comprising:
   a front contacting part configured to receive a weight of one of the user's feet generated by the action and transmit it to the front wheel supporting member; and
   a rear contacting part configured to receive a weight of another one of the user's feet generated by the action and transmit it to the rear wheel supporting member.

6. The traveling apparatus according to claim 1, wherein the control unit controls the driving unit so that the amount of a change in the speed for the amount of a change of the angle may be configured to be small in a low-speed region, while the amount of a change in the speed for the amount of a change of the angle may be configured to be large in a high-speed region.

7. The traveling apparatus according to claim 1, further comprising a coupling member coupled to the front wheel supporting member so that the coupling member receives a weight generated by the action from a back part of the user and transmits it to the front wheel supporting member.

8. The traveling apparatus according to claim 1, further comprising:
   a seating part coupled to the rear wheel supporting member and configured to allow the user to sit thereon;
   a pushing part coupled to the front wheel supporting member and configured to receive a weight of the user's foot generated by the action, and push the front wheel supporting member.

9. The traveling apparatus according to claim 1, further comprising:
   a coupling part coupled to the front wheel supporting member and configured to receive a weight from the user's back part, and
   a handlebar part coupled to the rear wheel supporting member and configured to allow the user to grip the handlebar part.

10. The traveling apparatus according to claim 1, wherein the rotation part is a hinge, and
    the adjusting mechanism includes a biasing member that biases the front wheel supporting member and the rear wheel supporting member in a direction to reduce the angle formed by the front wheel supporting member and the rear wheel supporting member.

11. The traveling apparatus according to claim 1, wherein the rotation part is an elastic member including one end connected to the front wheel supporting member and another end connected to the rear wheel supporting member, and
    the elastic member biases the front wheel supporting member and the rear wheel supporting member in a direction to reduce the angle formed by the front wheel supporting member and the rear wheel supporting member.

* * * * *